US012420243B2

(12) United States Patent  
Duer

(10) Patent No.: US 12,420,243 B2  
(45) Date of Patent: Sep. 23, 2025

(54) VENTURI ASPIRATOR THM/VOC REMOVAL SYSTEM

(71) Applicant: Red Valve Company, Inc., Pittsburgh, PA (US)

(72) Inventor: Michael J. Duer, Zelienople, PA (US)

(73) Assignee: Red Valve Company, Inc., Pittsburgh, PA (US)

( * ) Notice: Subject to any disclaimer, the term of this patent is extended or adjusted under 35 U.S.C. 154(b) by 269 days.

(21) Appl. No.: 17/985,608

(22) Filed: Nov. 11, 2022

(65) Prior Publication Data

US 2023/0149864 A1     May 18, 2023

Related U.S. Application Data

(60) Provisional application No. 63/278,546, filed on Nov. 12, 2021.

(51) Int. Cl.
| | |
|---|---|
| *B01F 23/23* | (2022.01) |
| *B01D 3/34* | (2006.01) |
| *B01F 23/232* | (2022.01) |
| *B01F 23/2326* | (2022.01) |
| *B01F 25/312* | (2022.01) |
| *B01F 25/431* | (2022.01) |
| *B01F 35/00* | (2022.01) |
| *C02F 1/20* | (2023.01) |
| *C02F 101/32* | (2006.01) |
| *C02F 101/36* | (2006.01) |

(52) U.S. Cl.
CPC ........ *B01F 23/23231* (2022.01); *B01D 3/346* (2013.01); *B01F 23/2326* (2022.01); *B01F 25/3121* (2022.01); *B01F 25/431* (2022.01); *B01F 35/187* (2022.01); *C02F 1/20* (2013.01); *C02F 2101/322* (2013.01); *C02F 2101/36* (2013.01)

(58) Field of Classification Search
CPC .............................. B01F 23/23; B01F 23/231
See application file for complete search history.

(56) References Cited

U.S. PATENT DOCUMENTS

| | | |
|---|---|---|
| 3,653,182 A | 4/1972 | Welch |
| 5,316,682 A | 5/1994 | Keyser et al. |
| 9,908,792 B1 | 3/2018 | Simnioniw et al. |
| 2007/0267334 A1 | 11/2007 | Osborn et al. |
| 2012/0006759 A1 | 1/2012 | Brooke et al. |
| 2012/0267318 A1 | 10/2012 | Hatten |
| 2015/0175461 A1 | 6/2015 | Leonard |
| 2015/0314248 A1* | 11/2015 | Castellote ......... B01F 23/23105 261/36.1 |
| 2018/0117497 A1 | 5/2018 | McKee |

FOREIGN PATENT DOCUMENTS

| | | | |
|---|---|---|---|
| DE | 2006002983 U | * | 4/2006 |
| JP | H09276162 A | * | 10/1997 |

* cited by examiner

*Primary Examiner* — Robert A Hopkins  
(74) *Attorney, Agent, or Firm* — The Webb Law Firm

(57) ABSTRACT

A trihalomethane (THM) and volatile organic compound (VOC) removal system includes: a storage vessel; a fluid inlet on the storage vessel where fluid enters said storage vessel; a fluid outlet on the storage vessel where fluid exits said storage vessel; and a fluid fitting on said storage vessel. Fluid leaves the storage vessel via an inlet conduit attached to the fluid fitting and flows through a pump and passes through a venturi aspirator, and returns to the storage vessel through an outlet conduit attached to the storage vessel.

17 Claims, 25 Drawing Sheets

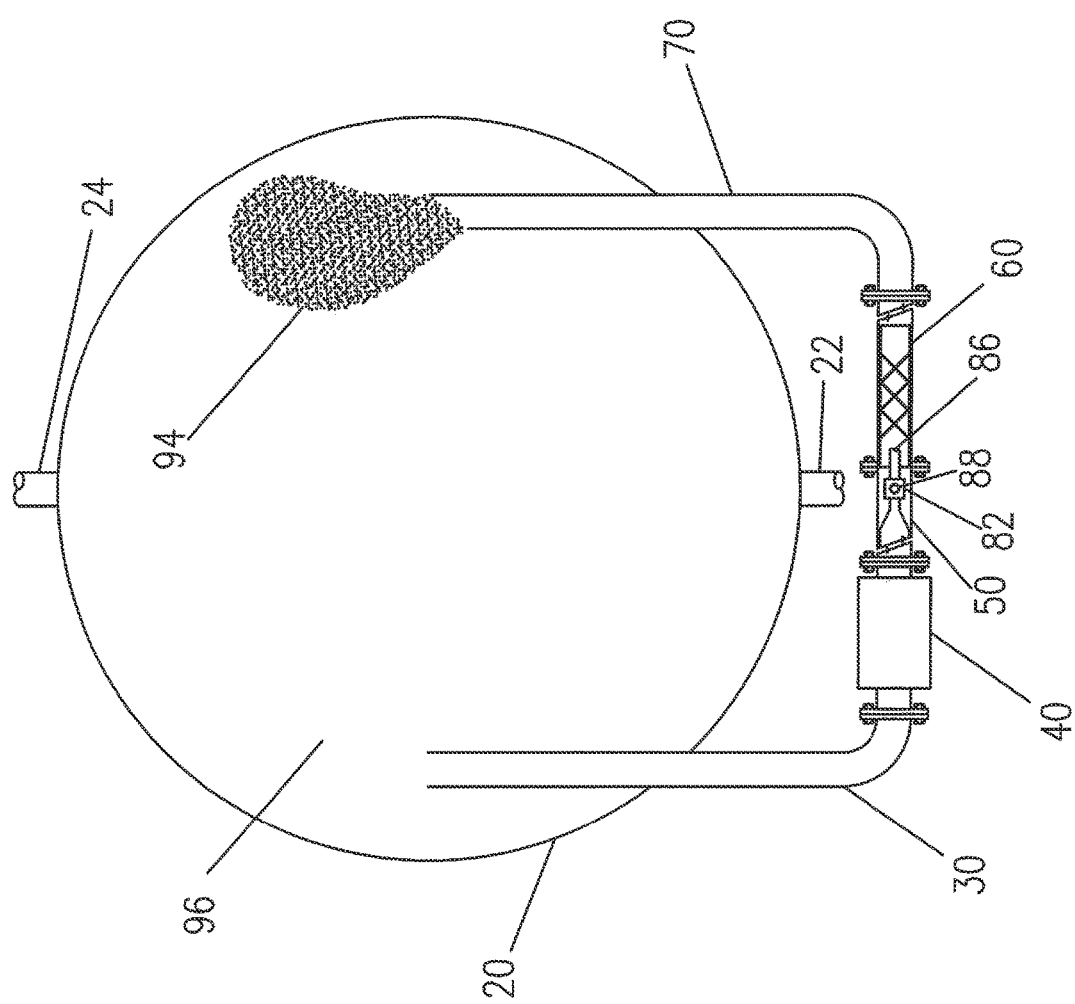

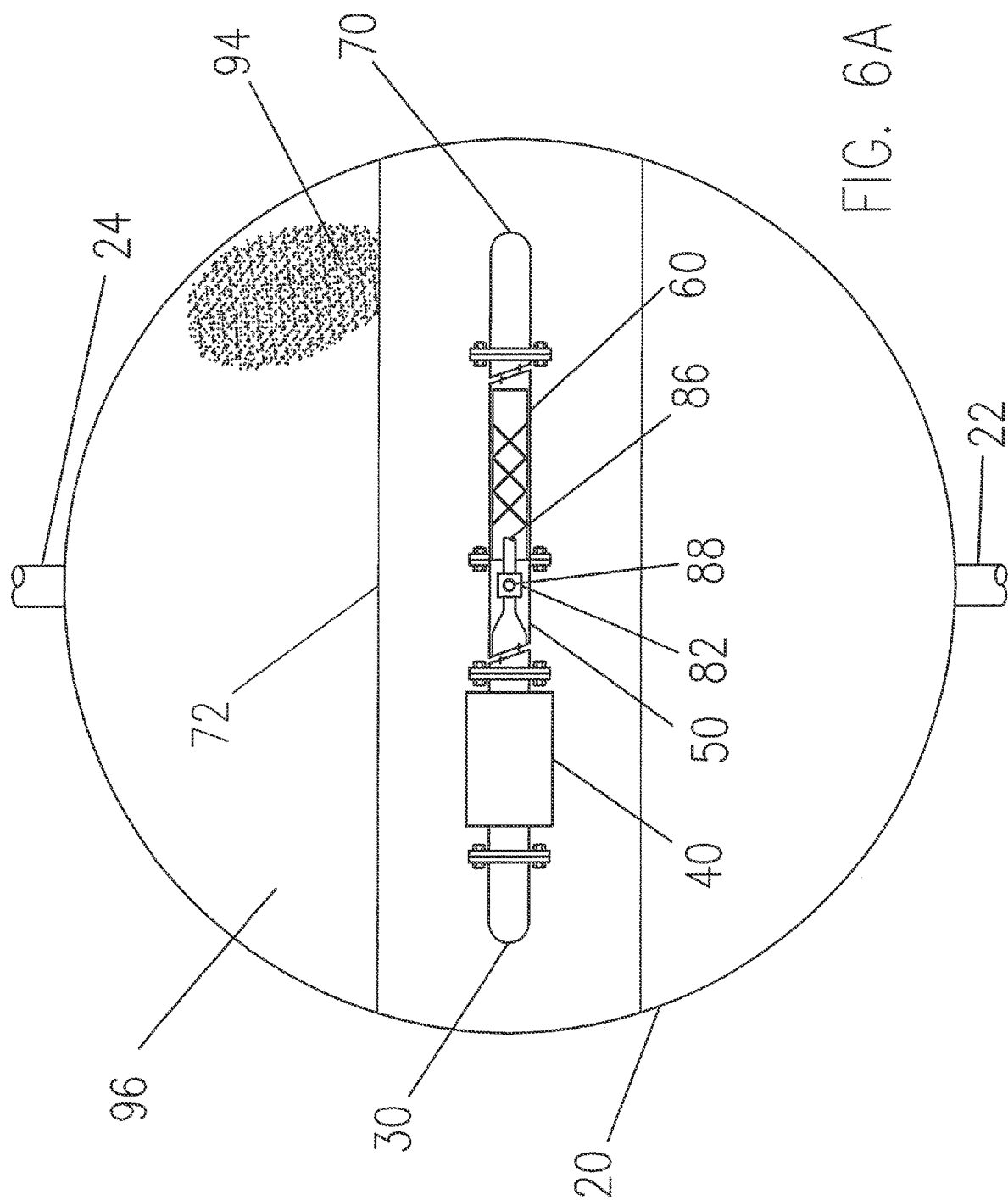

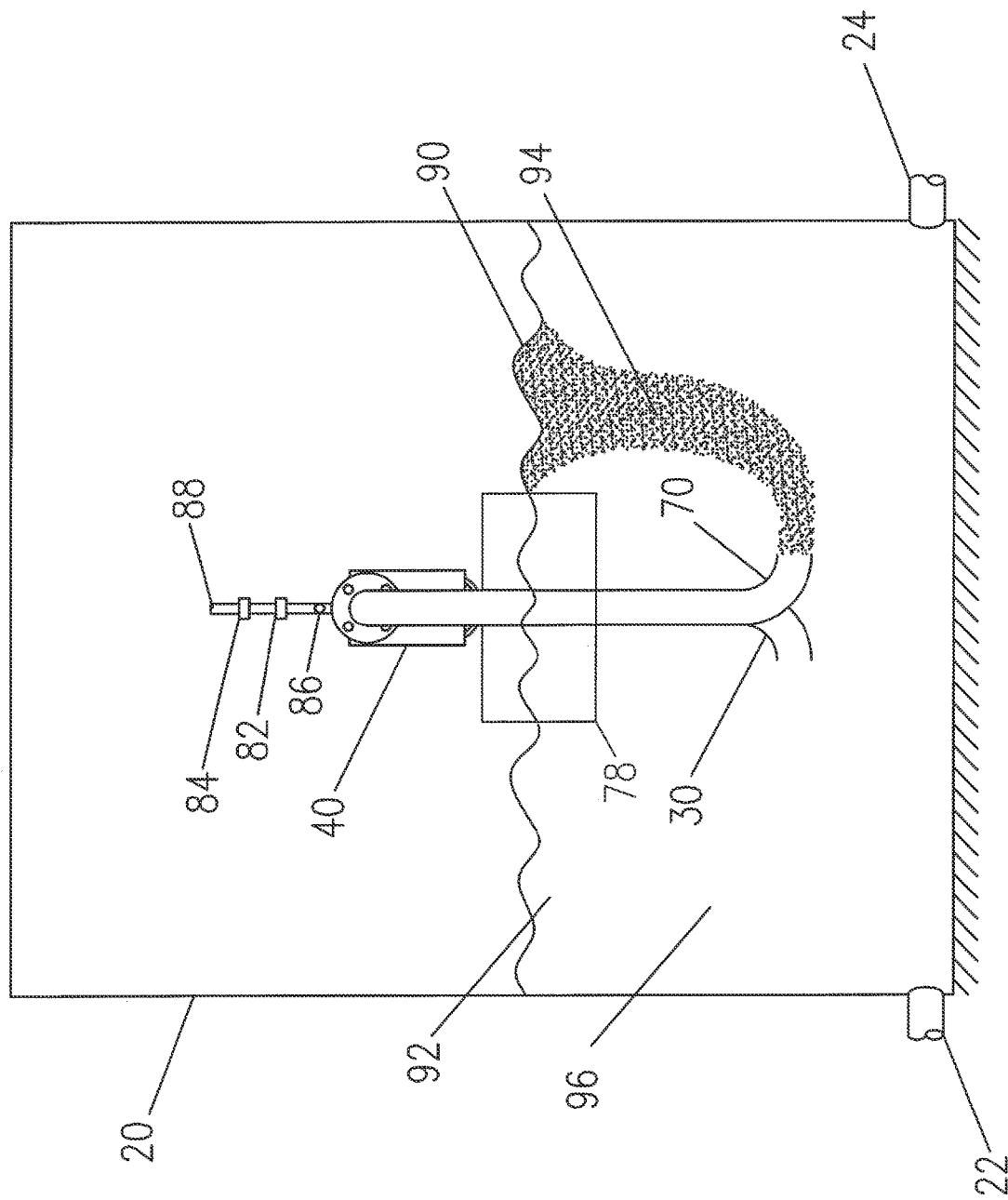

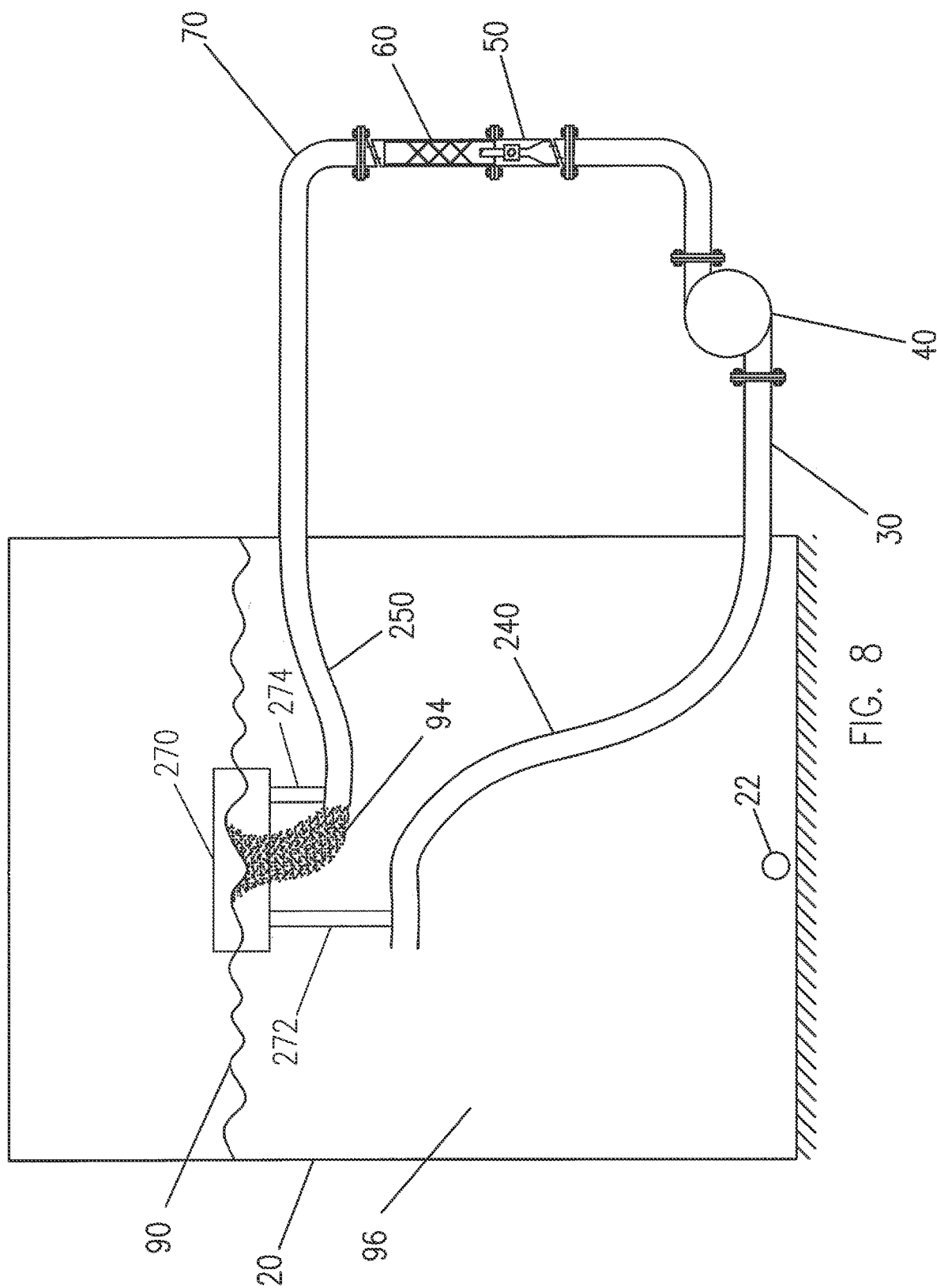

VENTURI ASPIRATOR THM/VOC REMOVAL SYSTEM

CROSS REFERENCE TO RELATED APPLICATION

This application claims the benefit of U.S. Provisional Application No. 63/278,546, filed Nov. 12, 2021, which is incorporated herein by reference in its entirety.

BACKGROUND OF THE INVENTION

Field of the Invention

The present invention is directed to an improved post-treatment aeration system to reduce trihalomethanes (THMs) and other volatile organic compounds (VOCs) in potable water systems.

Description of Related Art

High levels of THMs and VOCs that are present in chlorinated potable water systems need to be reduced to conform to government regulations. Traditional "air stripping" methods currently in use require additional equipment and substantial energy use. Examples of such equipment are "counter-current packed columns", air diffusers, and spray aerators. Although these methods are somewhat effective, a need exists for a system that is lower in initial capital cost, lower in installation cost, lower in maintenance cost, and lower in energy use.

It is therefore an object of the present invention to provide an effective post-treatment aeration system to reduce trihalomethanes (THMs) and volatile organic compounds (VOCs) in potable water systems that has lower total life cycle cost than customary systems.

It is a further object of the present invention to provide a sub-system that can be added to existing trihalomethane (THM) & volatile organic compound (VOC) reducing systems to provide greater overall efficiency.

SUMMARY OF THE INVENTION

In one non-limiting embodiment, the present invention includes a venturi type aspirator with an upstream pump. The primary flow of water is from a storage tank, through the pump, through the venturi aspirator where it assimilates air (or oxygen), and is then returned to the storage tank. The inlet and outlet connection to the water tank may be at the same elevation or different elevations, as best suits the specific application. Air (or oxygen) is introduced into the primary water flow stream through venturi action in the aspirator. An optional check valve is provided to prevent backflow in the event of pump failure. An optional filter is provided to decontaminate the incoming air (or oxygen). An auxiliary conduit connection is provided to allow introducing sanitizing fluid (gas or liquid) via the venturi aspirator intake port.

In another non-limiting embodiment, the present invention includes a venturi type aspirator with an upstream pump, and downstream static mixer. The primary flow of water is from a storage tank, through the pump, the venturi aspirator, the static mixer, and then returned to the storage tank. The inlet and outlet connection/conduits to the water tank may be at the same elevation or different elevations, as best suits the specific application. Air (or oxygen) is introduced into the primary water flow stream through venturi action in the aspirator. The gas bubbles at this point are relatively large and present a relatively small surface area with the water. As the gas and water mixture passes through the static mixer the bubbles are dispersed and become relatively small, presenting a much larger total surface area to the water, thereby enhancing trihalomethane (THM) and volatile organic compound (VOC) removal. An optional check valve is provided to prevent backflow in the event of pump failure. An optional filter is provided to decontaminate the incoming air. An auxiliary conduit connection is provided to allow introducing sanitizing fluid via the venturi aspirator intake port.

A further non-limiting embodiment uses an extension on the inlet conduit to collect the inlet flow from a specific locations \in the storage tank, and/or an extension on the outlet conduit to discharge the outlet flow to a specific location in the storage tank. In yet a further non-limiting embodiment, an extension with multiple ports can be on the exit conduit to more widely distribute the discharge mixture over a larger area of the storage tank.

In certain non-limiting embodiments, the present invention uses extended piping to allow water to be drawn from, and returned to, the storage tank without the need to penetrate the tank walls. This is especially desirable in retrofit applications where the storage tank may be in use, and filled with water, during the installation process.

In a further non-limiting embodiment, the pump, venturi aspirator and static mixer are inside the storage tank on a platform supported by the storage tank walls, ceiling, or other fixed structure. In another non-limiting embodiment, the pump, venturi aspirator and static mixer are inside the storage tank, atop a platform which floats on the water.

In some non-limiting embodiments, the present invention uses flexible, or hinged, inlet and/or outlet conduit attached to the floating platform, which automatically maintains a constant depth of submersion of the inlet and/or outlet regardless of water level inside the tank. The inlet and outlet may be at the same depth relative to the water surface, or may be at different depths relative to the water surface, as best suits the specific application.

Another non-limiting embodiment uses an automatic air release valve to reduce the amount of excess air introduced into the storage tank.

In certain non-limiting embodiments, the present invention uses a single pump, multiple venturi aspirators, multiple static mixers, and several valves to select an input from different locations on the storage tank and/or select an output to different locations on the storage tank. The specific venturi aspirators and static mixers are selected using either manually operated or automated in-line valves.

Another non-limiting embodiment, the present invention uses a single pump, single venturi aspirator, single static mixer, and several valves to select an input from different locations on the storage tank and/or select an output to different locations on the storage tank. The specific venturi aspirators and static mixers are selected using either manually operated or automated in-line valves.

In another non-limiting embodiment, the venturi aspirator, with or without a static mixer, is installed in a conventional spray nozzle system between the pump and spray nozzle to augment the trihalomethane (THM) and volatile organic compound (VOC) reduction provided by the spray nozzle.

BRIEF DESCRIPTION OF THE DRAWINGS

FIG. 3 is a plan view of the present invention with an extension on the inlet conduit to collect the inlet flow from a specific locations \in the storage tank, and/or an extension on the outlet conduit to discharge the outlet flow to a specific location in the storage tank.

FIG. 6A is a plan view of the present invention with the pump, venturi aspirator and static mixer inside the storage tank, on a platform supported by the storage tank walls, ceiling, or other fixed structure.

FIG. 7C is a side elevation view of the present invention with the pump, venturi aspirator and static mixer inside the storage tank, atop a suitable device floating on the water.

FIG. 8 is a front elevation view of the present invention that uses flexible inlet and flexible outlet conduit attached to a floating apparatus which automatically maintains a constant depth of submersion of the inlet and outlet regardless of water level inside the tank.

DESCRIPTION OF THE INVENTION

Figure 1A:
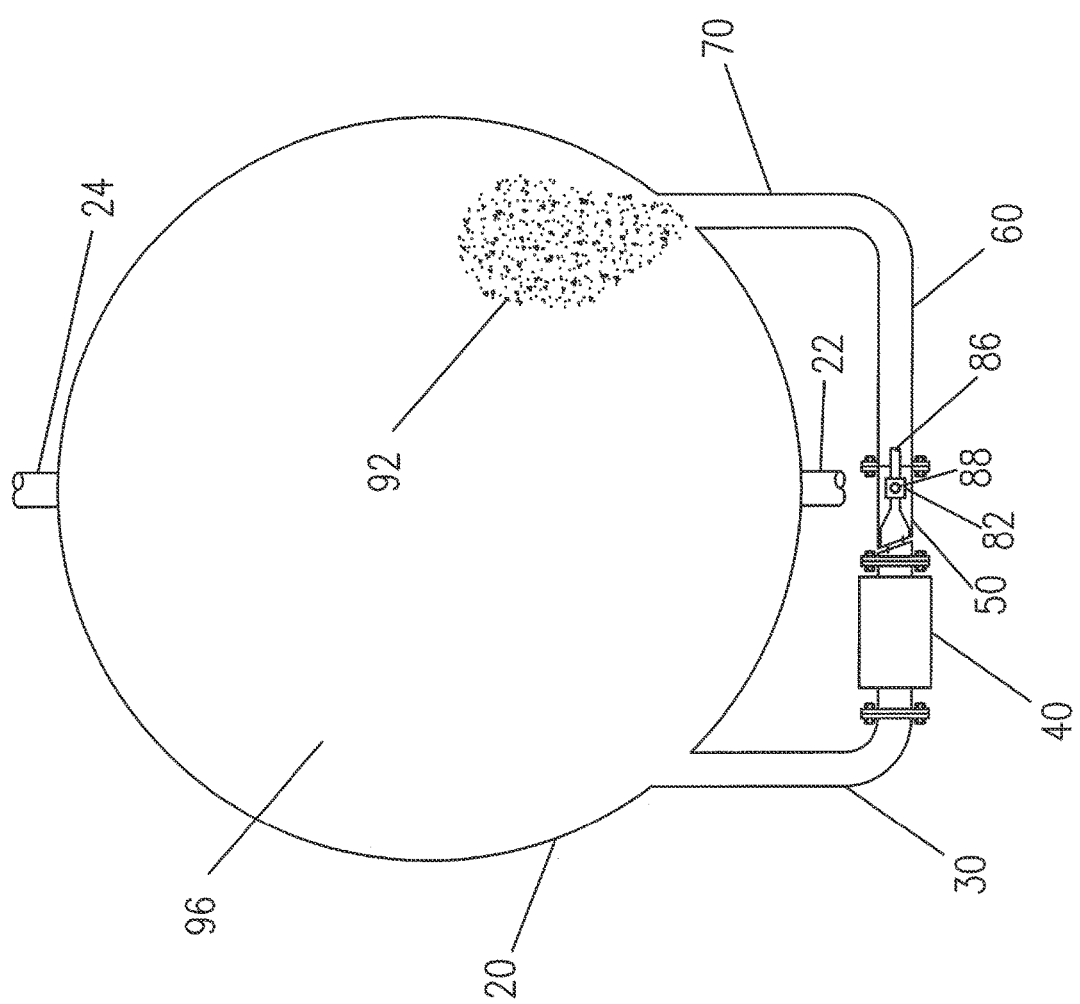
FIG. 1A is a plan view of the present invention with the venturi aspirator shown in section view. In all FIGS. the tank walls are considered to be transparent to more clearly show the apparatus inside the tank as well as outside the tank.

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

Further, the terms "upper," "lower," "right," "left," "vertical," "horizontal," "top," "bottom," "lateral," "longitudinal," and derivatives thereof shall relate to the invention as it is oriented in the drawing figures. However, it is to be understood that the invention may assume alternative variations and step sequences, except where expressly specified to the contrary. It is also to be understood that the specific devices and processes illustrated in the attached drawings, and described in the specification, are simply exemplary embodiments of the invention. Hence, specific dimensions and other physical characteristics related to the embodiments disclosed herein are not to be considered as limiting.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

Figure 1B:
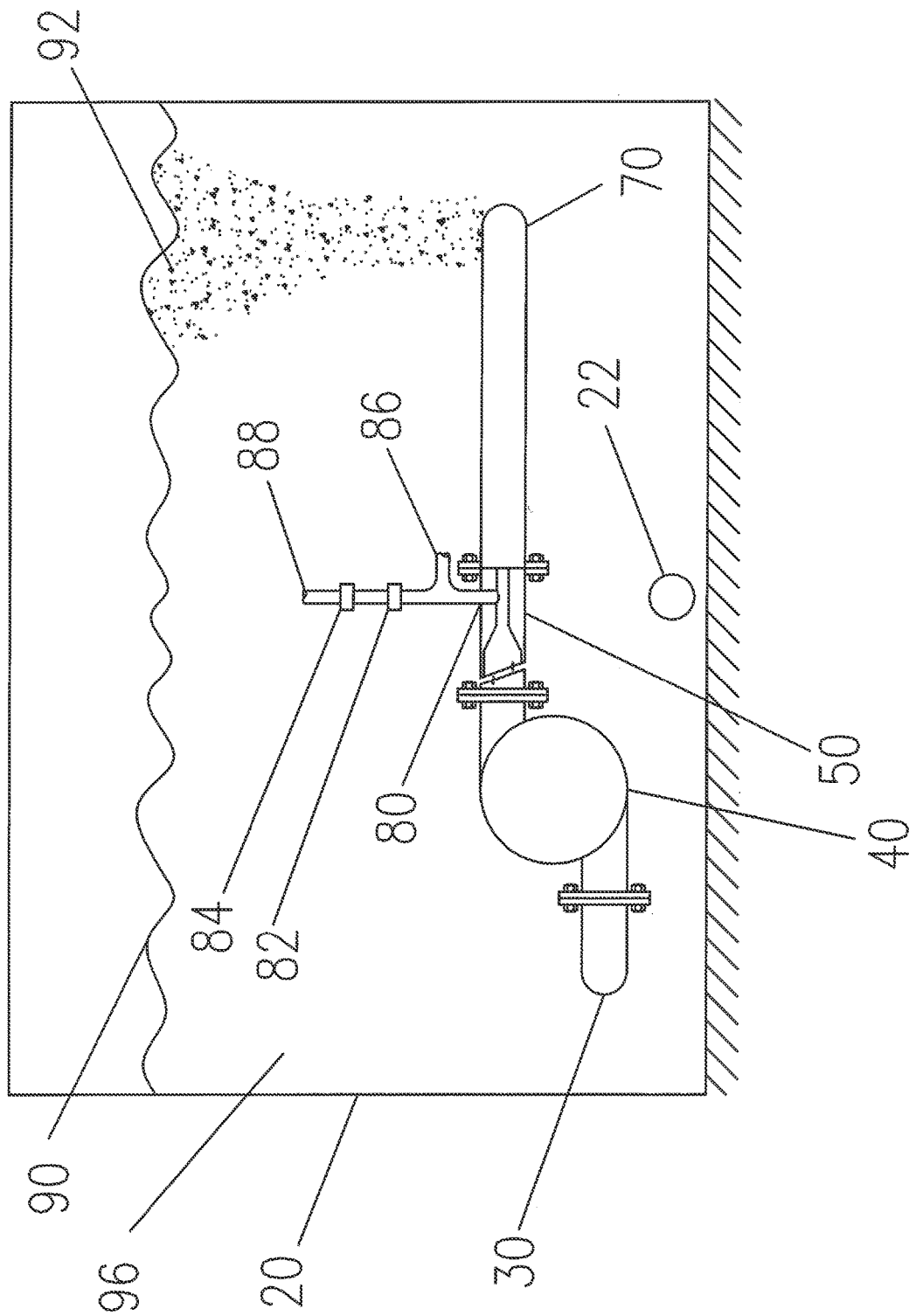
FIG. 1B is a front elevation view of the present invention with the venturi aspirator shown in section view.
Figure 1C:
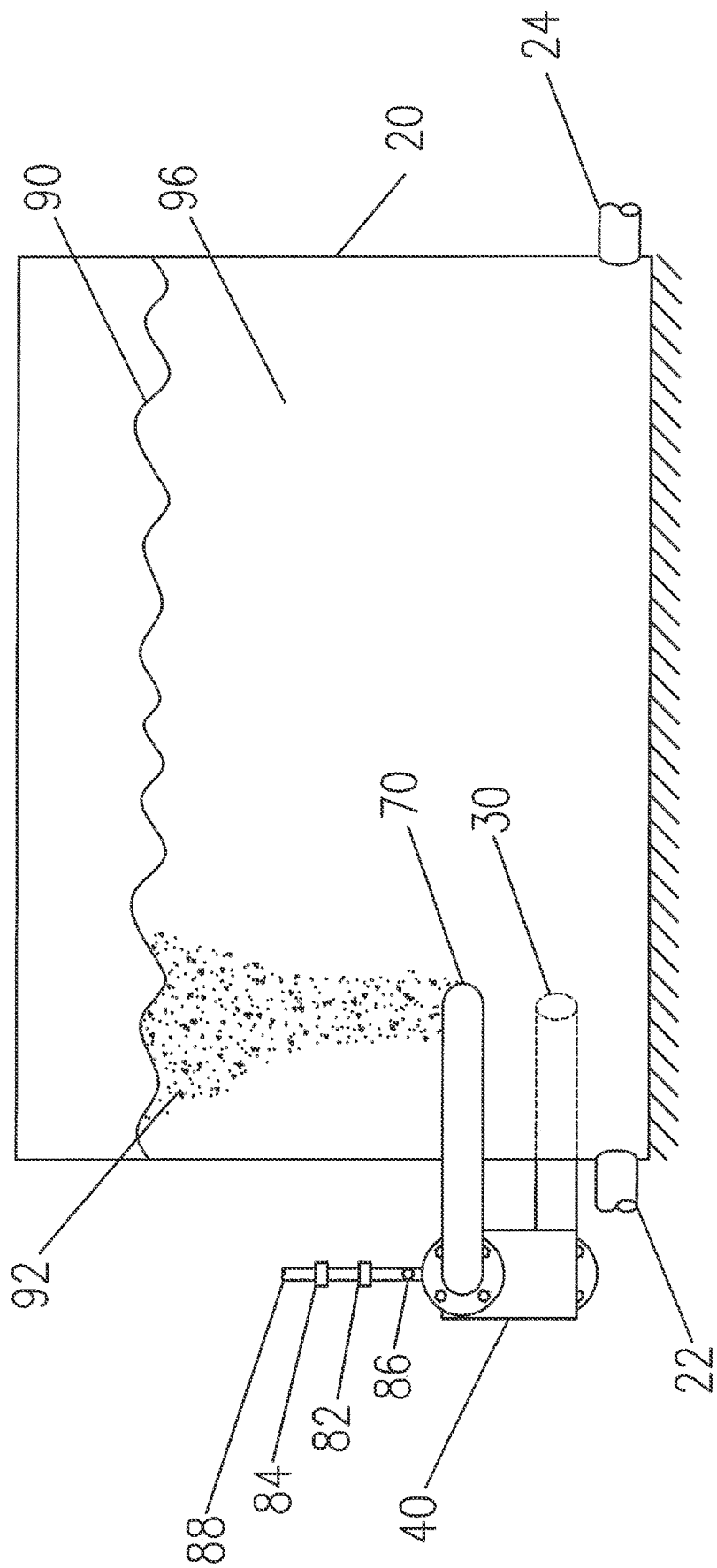
FIG. 1C is a side elevation view of the present invention with the venturi aspirator shown in section view.

Referring to FIGS. 1A, 1B and 1C, the THM and VOC reduction components are shown mounted alongside of a potable water storage tank 20 containing water 96 containing THMs and/or VOCs. The direction of water flow is from the storage tank 20, through connecting inlet conduit 30, through a pump 40, through a venturi aspirator 50, and then returns to the storage tank through an outlet conduit 70. Pump 40 may be operated by any common power source such as an electric motor or gasoline engine. The power source is not shown for clarity. Air is drawn into the venturi aspirator 50 from the surrounding atmosphere through air inlet port 88. The air passes through filter 84 which prevents particulate matter from entering the system. The filtered air then passes through check valve 82 which prevents reverse water flow out of the venturi inlet port 80 when the pump is not operating or operating at degraded performance. The return flow includes air mixed with the water 96 resulting in a discharge including relatively large air bubbles 92. As shown, both the inlet conduit 30 and outlet conduit 70 of the system are below the water surface 90. While it is essential that the inlet be below the water surface 90, the outlet conduit 70 can be at any level, including above the water surface 90. The storage tank 20 also includes an inlet port 22 connecting the tank to a source of water to be treated and an outlet port 24 to supply treated water as necessary.

Figure 2A:
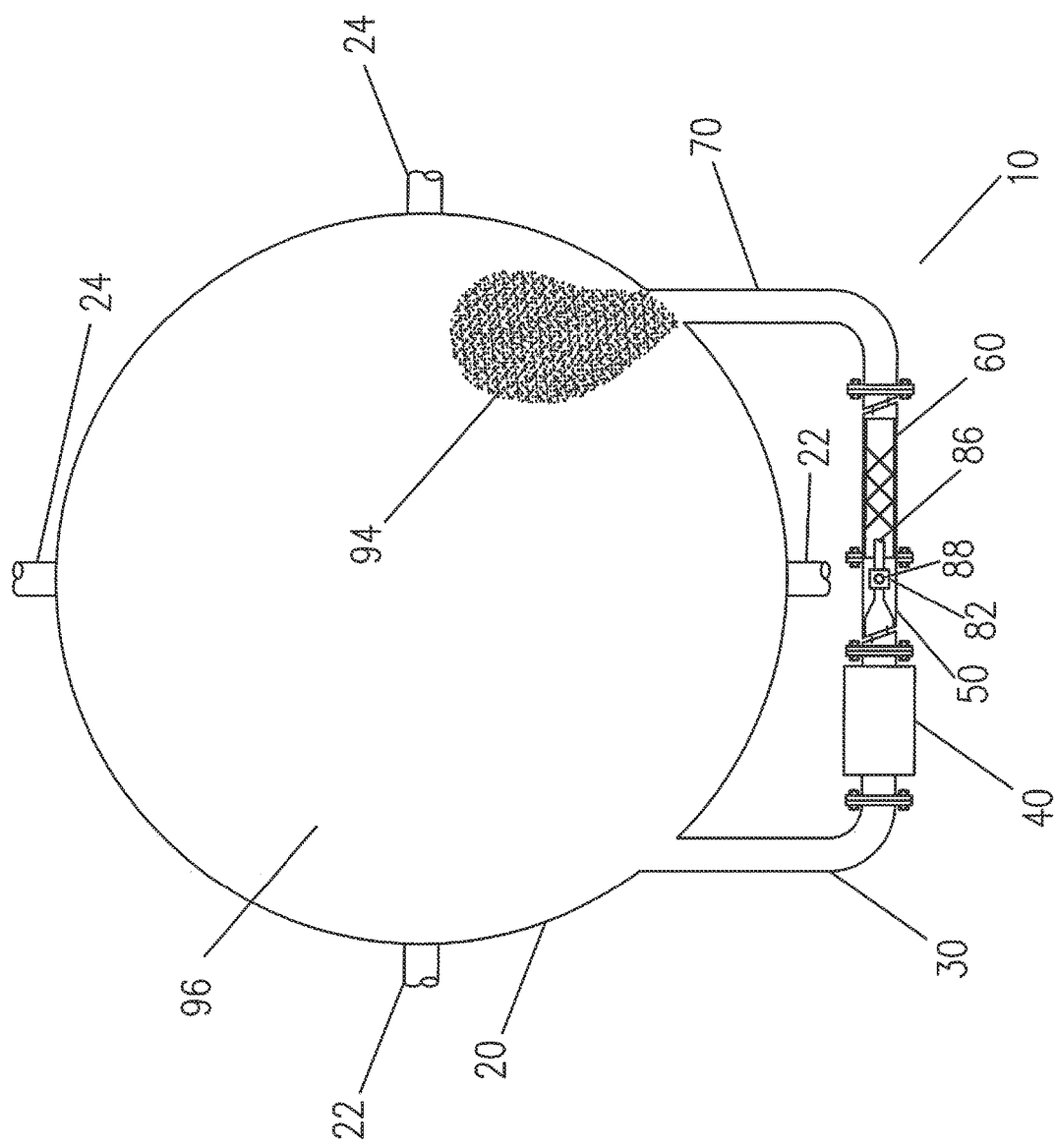
FIG. 2A is a plan view of the present invention with the venturi aspirator and a static mixer shown in section view.
Figure 2B:
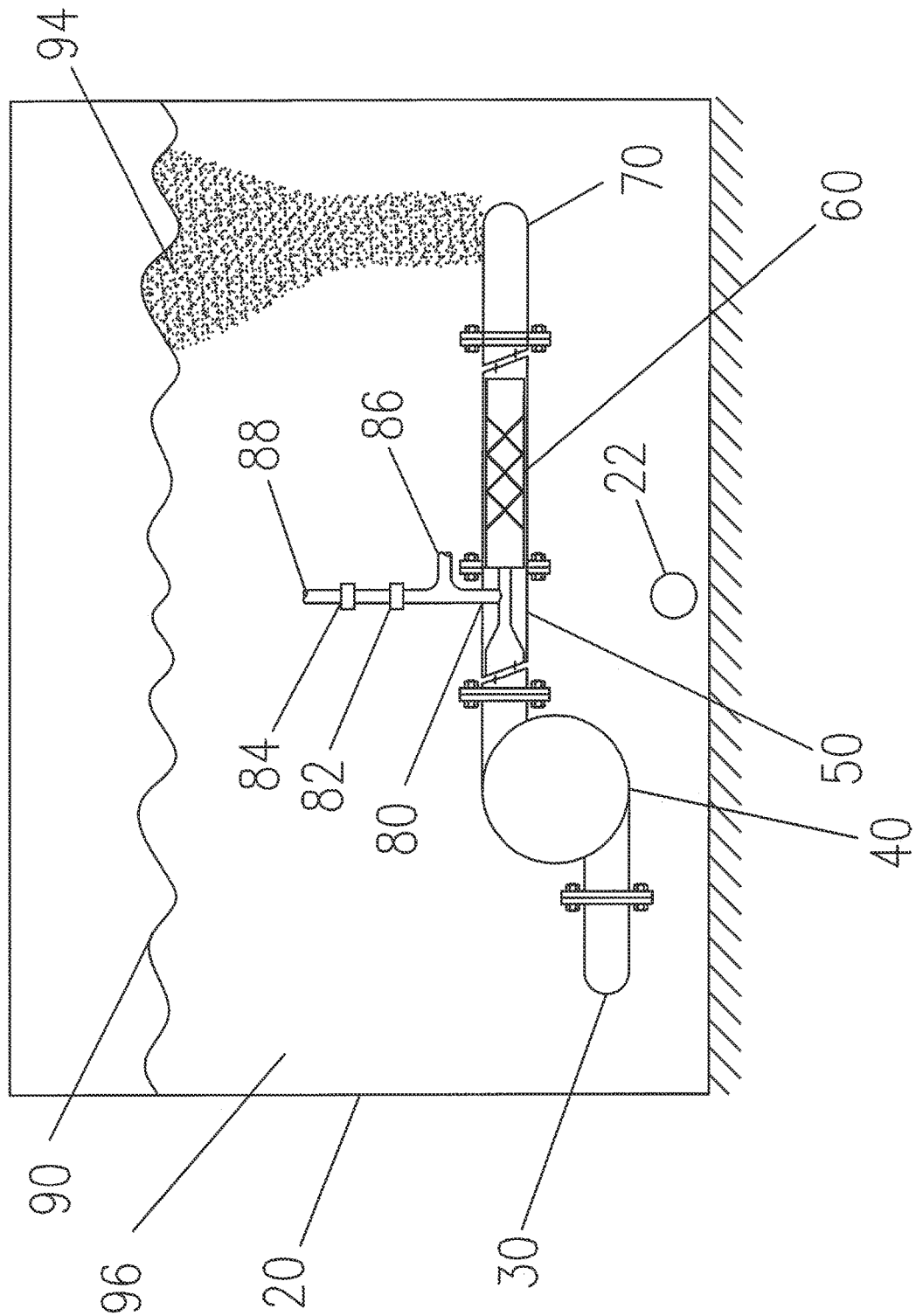
FIG. 2B is a front elevation view of the present invention with the venturi aspirator and static mixer shown in section view.
Figure 2C:
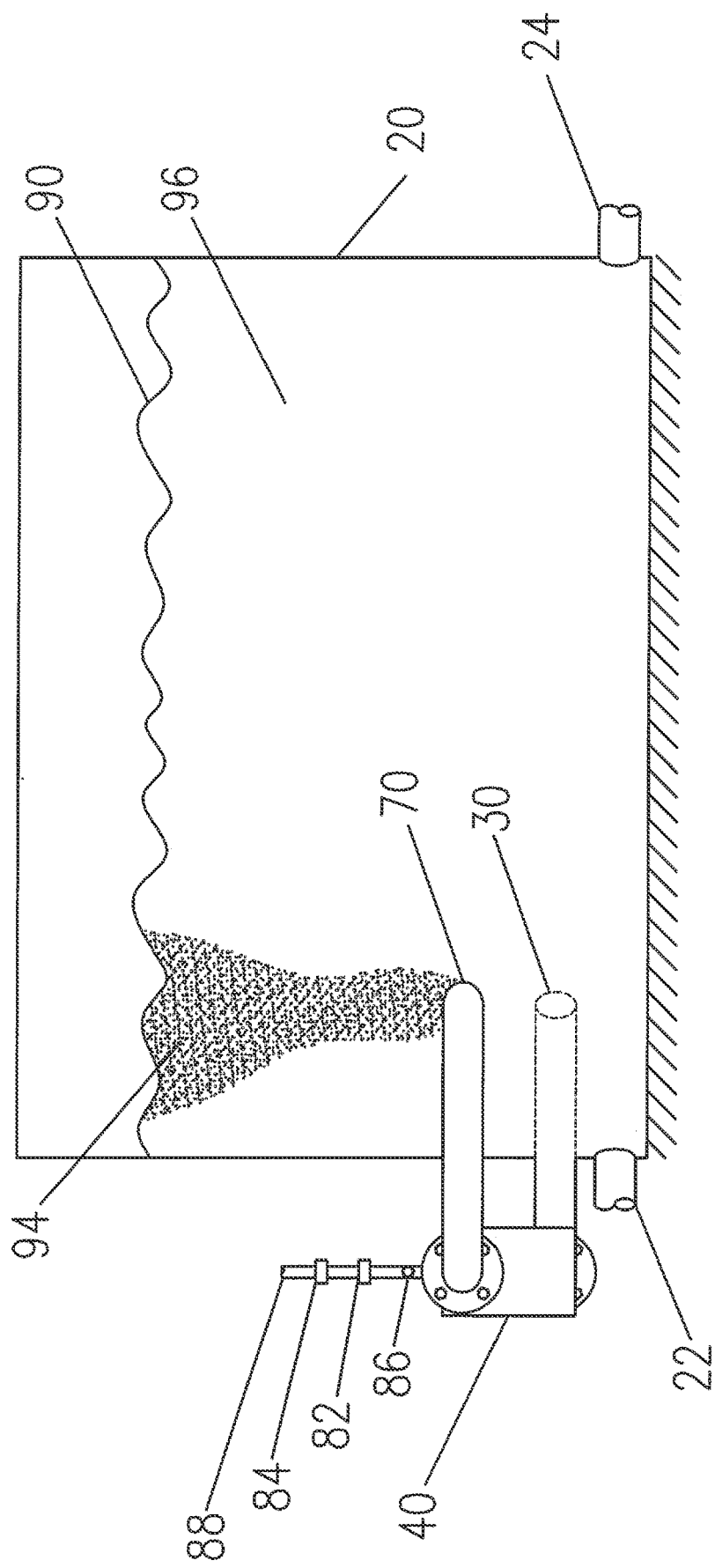
FIG. 2C is a side elevation view of the present invention with the venturi aspirator and static mixer shown in section view.

Referring to FIGS. 2A, 2B and 2C, the THM and VOC reduction system of FIGS. 1A, 1B and 1C is modified to include a static mixer 60. The THM and VOC reduction components are shown mounted alongside of a potable water storage tank 20 containing water 96 containing THMs and/or VOCs. The direction of water flow is from the storage tank 20, through connecting conduit 30, through a pump 40, through a venturi aspirator 50, through a static mixer 60, and then returns to the storage tank through conduit 70. Pump 40 may be operated by any common power source such as an electric motor or gasoline engine. The power source is not shown for clarity. Air is drawn into the venturi from the surrounding atmosphere through air inlet port 88. The air passes through filter 84 which prevents particulate matter from entering the system. The filtered air then passes through check valve 82 which prevents reverse water flow out of the venturi inlet port 80 when the pump is not operating or operating at degraded performance. By using static mixer 60 the air bubbles 94 mixed with the water 96 are much smaller and present a larger surface area which enhances THM and VOC reduction. As shown, both the inlet conduit 30 and outlet conduit 70 of the system are below the water surface 90. While it is essential that the inlet conduit 30 be below the water surface 90, the outlet conduit 70 can be at any level, including above the water surface 90. The storage tank 20 also includes an inlet port 22 connecting the tank to a source of water to be treated and an outlet port 24 to supply treated water as necessary.

Referring to FIG. 3, the system of FIGS. 2A, 2B and 2C is modified to include inlet conduit extension 32 connected to inlet conduit 30, and outlet conduit extension 79 connected to outlet conduit 70, to allow collecting the inlet flow and discharging the outlet flow to specific locations in the storage tank 20.

Figure 4:
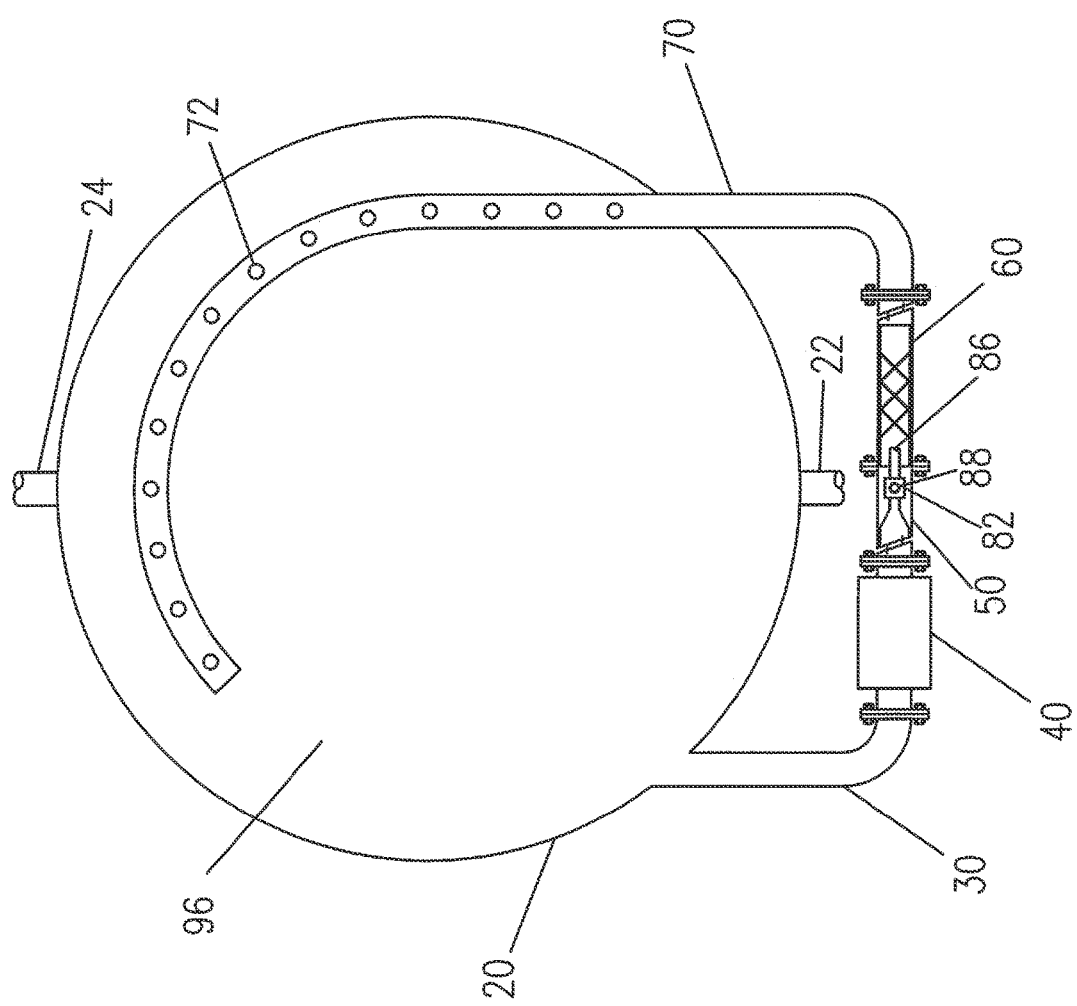
FIG. 4 is a plan view of the present invention with an extension with multiple ports on the exit conduit to more widely distribute the discharge mixture over a larger area of the storage tank.

Referring to FIG. 4, the system of FIGS. 2A, 2B and 2C is modified to include a perforated conduit extension 72 connected to outlet conduit 70 to allow discharging and dispersing the outlet flow bubbles 94 over a larger area of the storage tank 20. Air bubbles 94 are not shown for clarity.

Figure 5A:
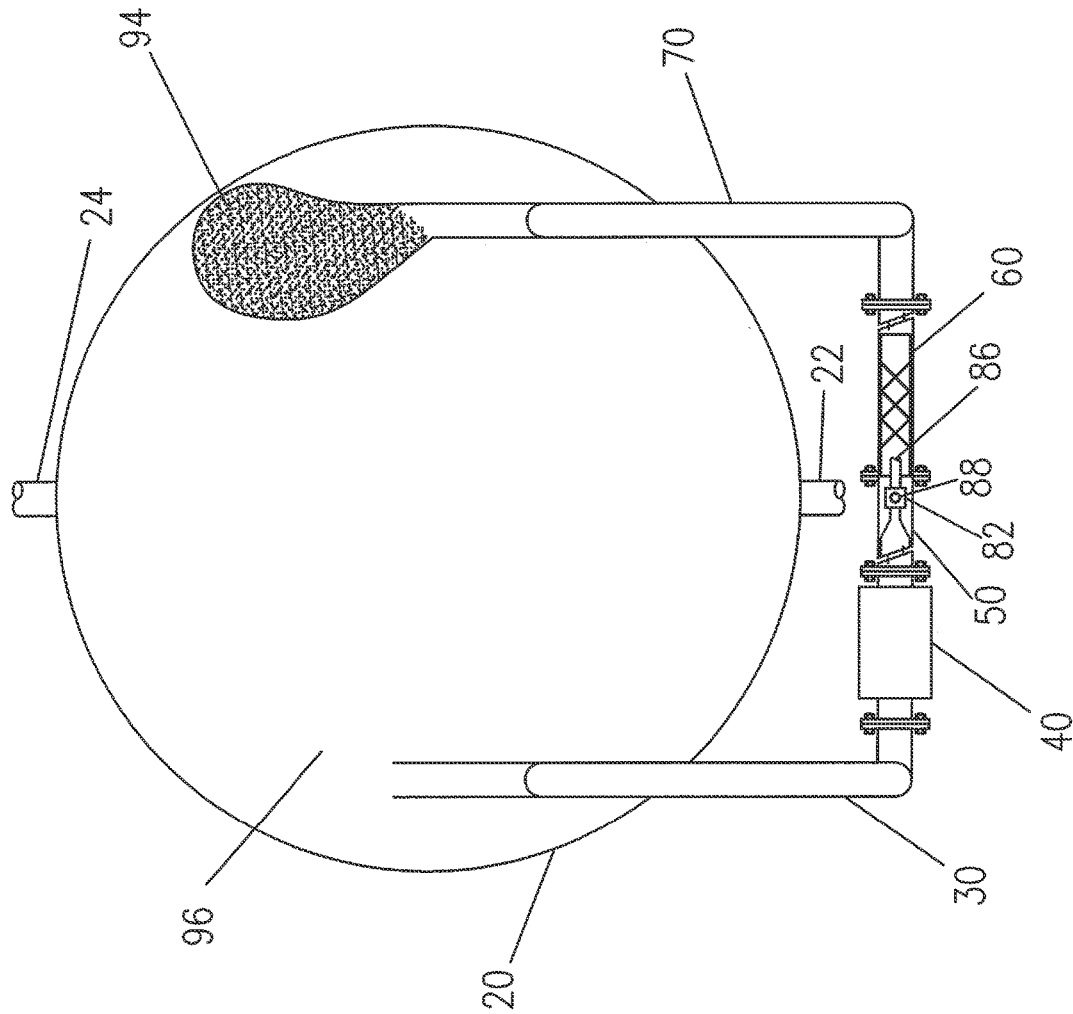
FIG. 5A is a plan view of the present invention with extended piping to allow water to be drawn from, and returned to, the storage tank without the need to penetrate the tank walls.
Figure 5B:
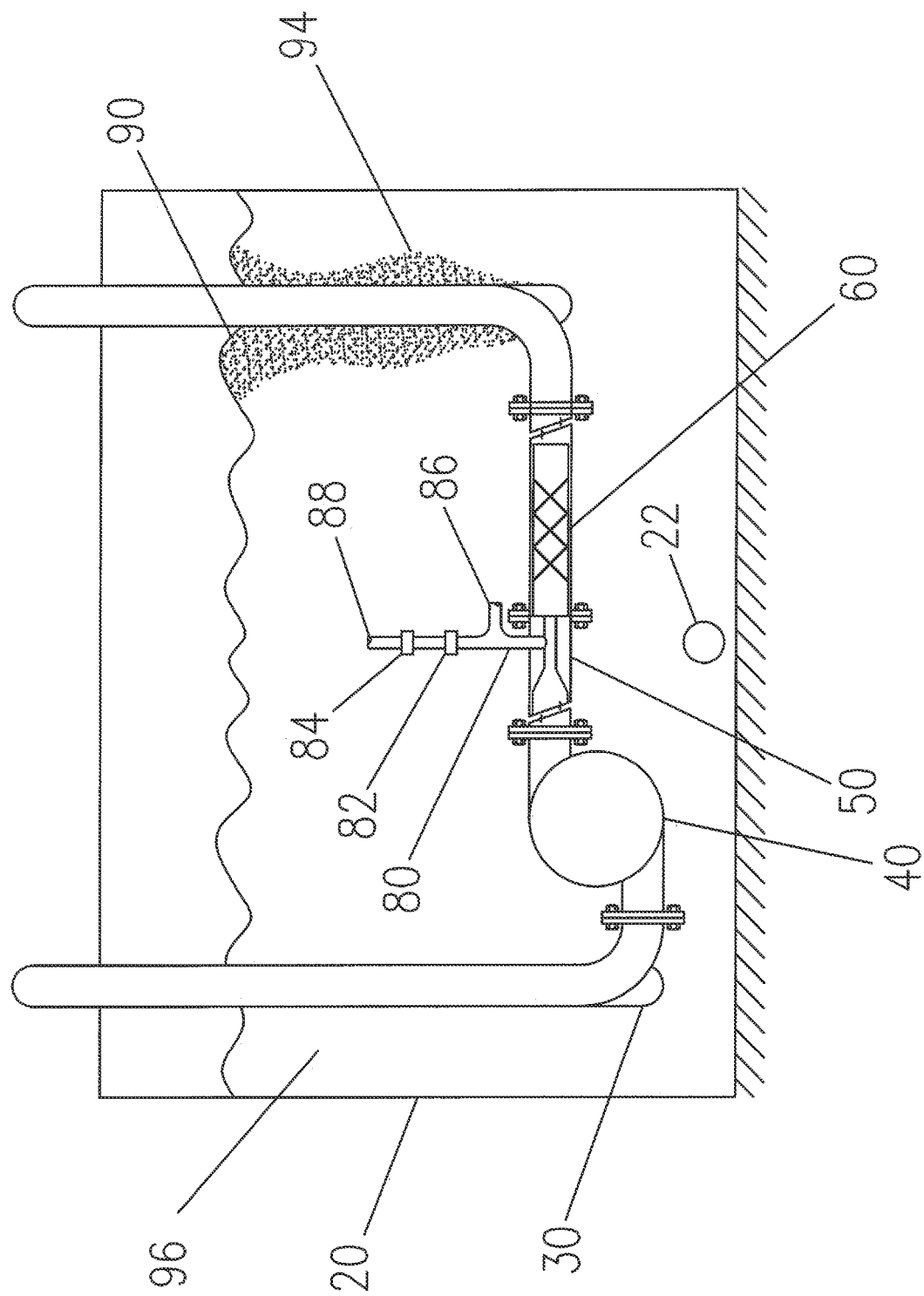
FIG. 5B is a front elevation view of the present invention with extended piping to allow water to be drawn from, and returned to, the storage tank without the need to penetrate the tank walls.
Figure 5C:
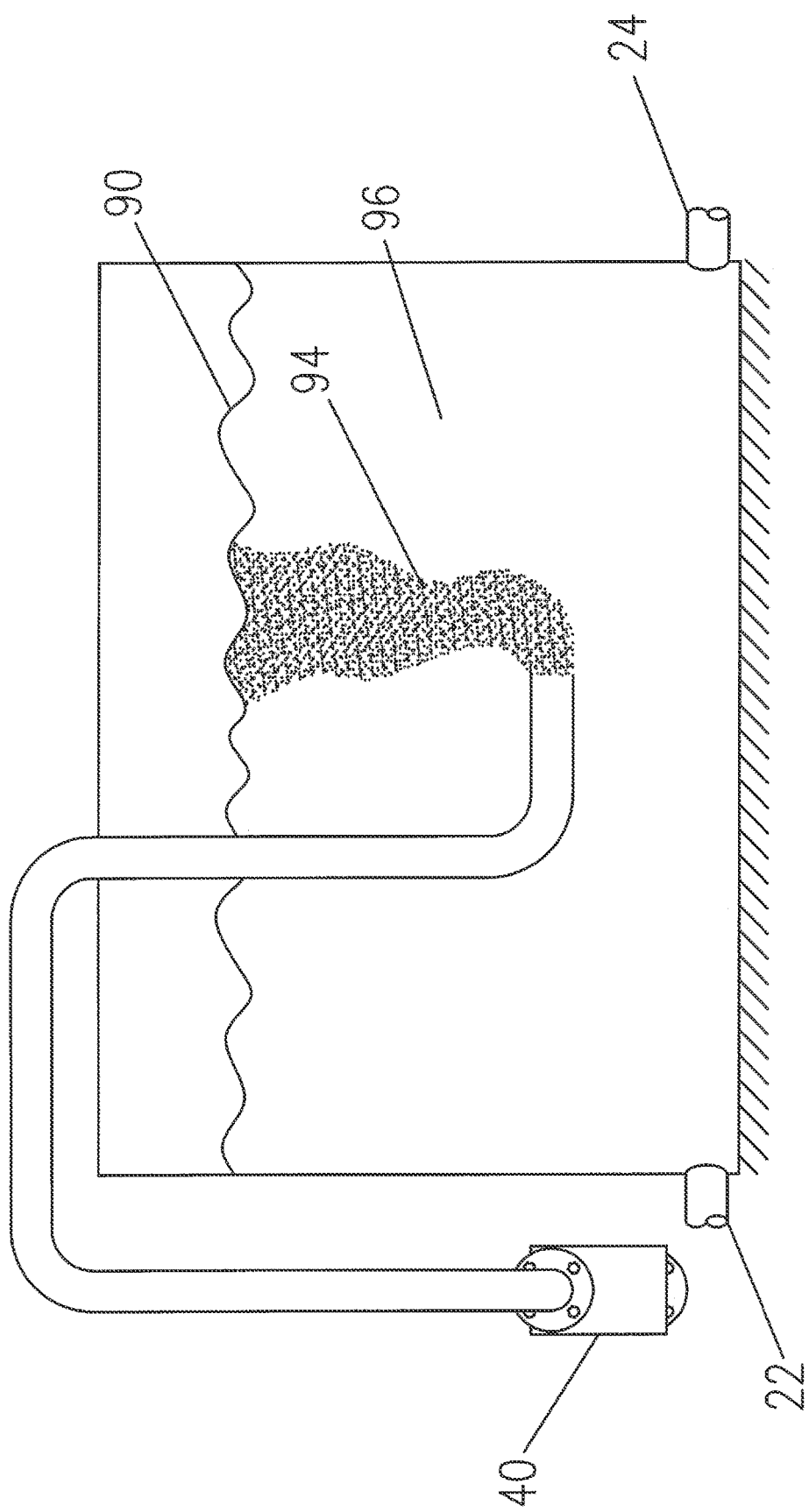
FIG. 5C is a side elevation view of the present invention with extended piping to allow water to be drawn from, and returned to, the storage tank without the need to penetrate the tank walls.

Referring to FIGS. 5A, 5B, and 5C, the system of FIGS. 2A, 2B and 2C is modified to route the inlet conduit 30 and outlet conduit 70 over the storage tank 20 sidewall without the need to penetrate the sidewall of the storage tank 20.

Figure 6B:
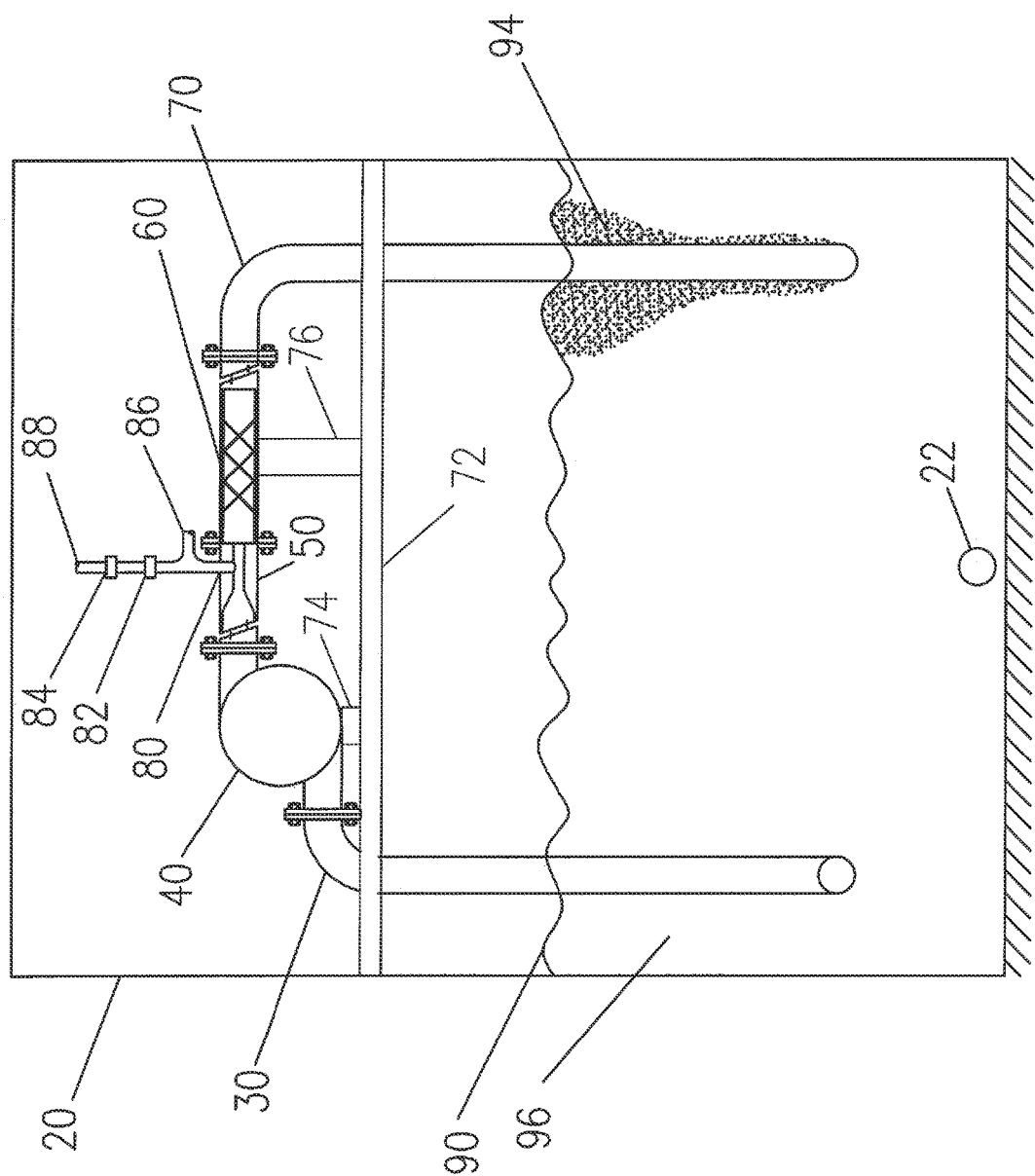
FIG. 6B is a front elevation view of the present invention with the pump, venturi aspirator and static mixer inside the storage tank, on a platform supported by the storage tank walls, ceiling, or other fixed structure.
Figure 6C:
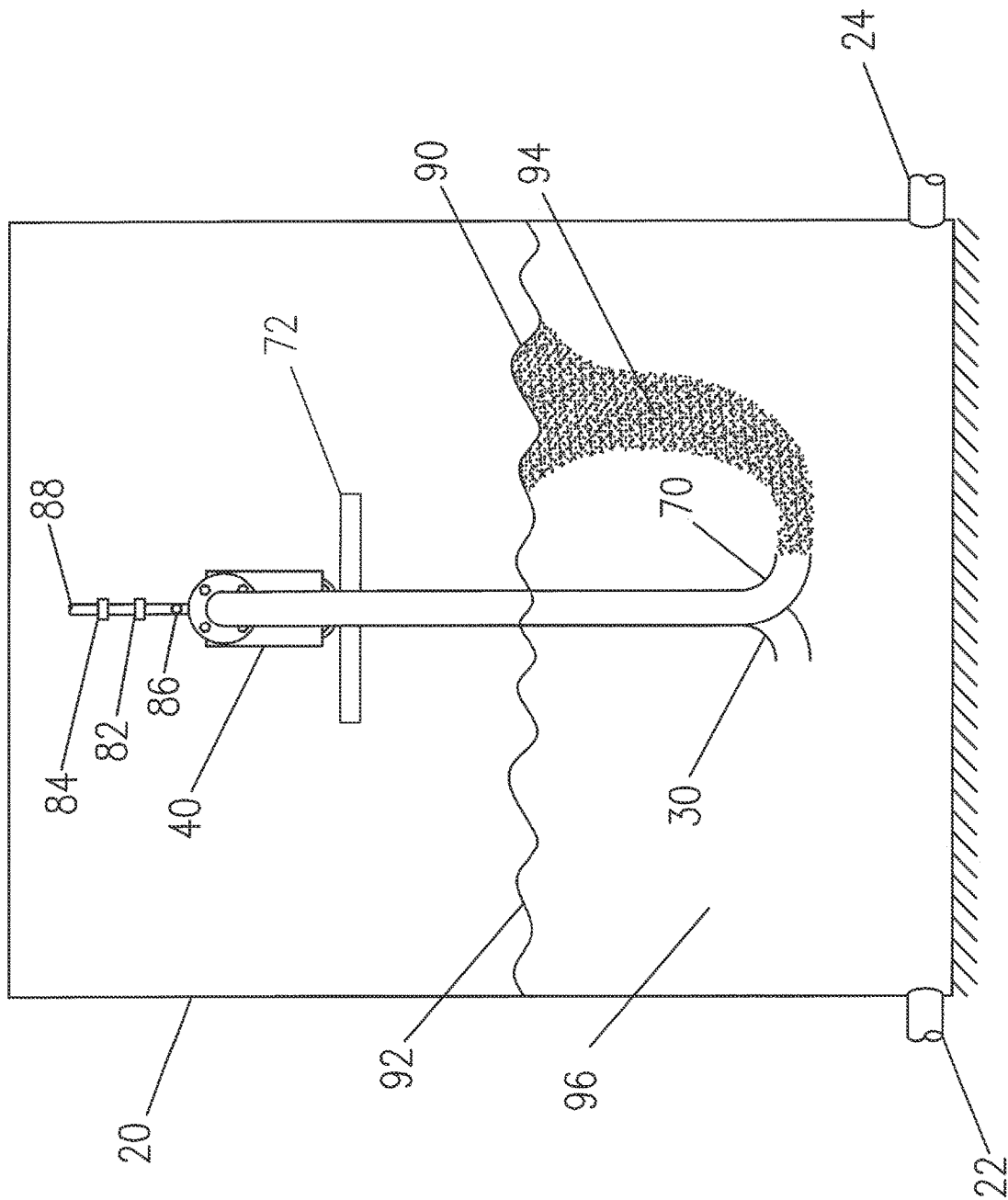
FIG. 6C is a side elevation view of the present invention with the pump, venturi aspirator and static mixer inside the storage tank, on a platform supported by the storage tank walls, ceiling, or other fixed structure.

Referring to FIGS. 6A, 6B, and 6C, the system of FIGS. 2A, 2B and 2C is installed inside the storage tank 20 mounted on support 74, support 76 and platform 72. The platform 72 is fastened to the storage tank 20 using suitable and common methods such as welding or bolting, which are not shown for clarity. The platform 72 and supports 74 and 76 are typically made of steel but may be any suitable material.

Figure 7A:
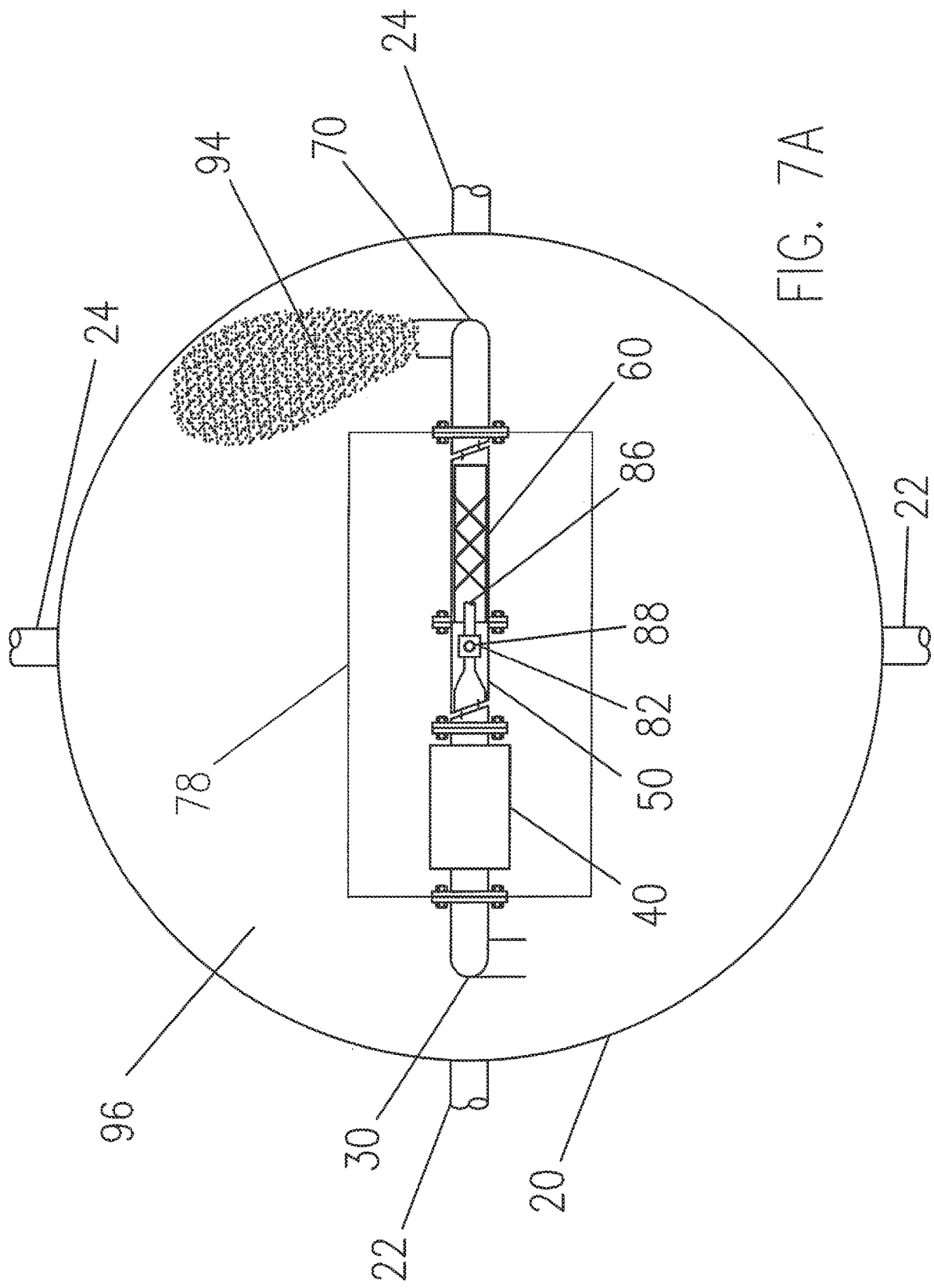
FIG. 7A is a plan view of the present invention with the pump, venturi aspirator and static mixer inside the storage tank, atop a suitable device floating on the water.
Figure 7B:
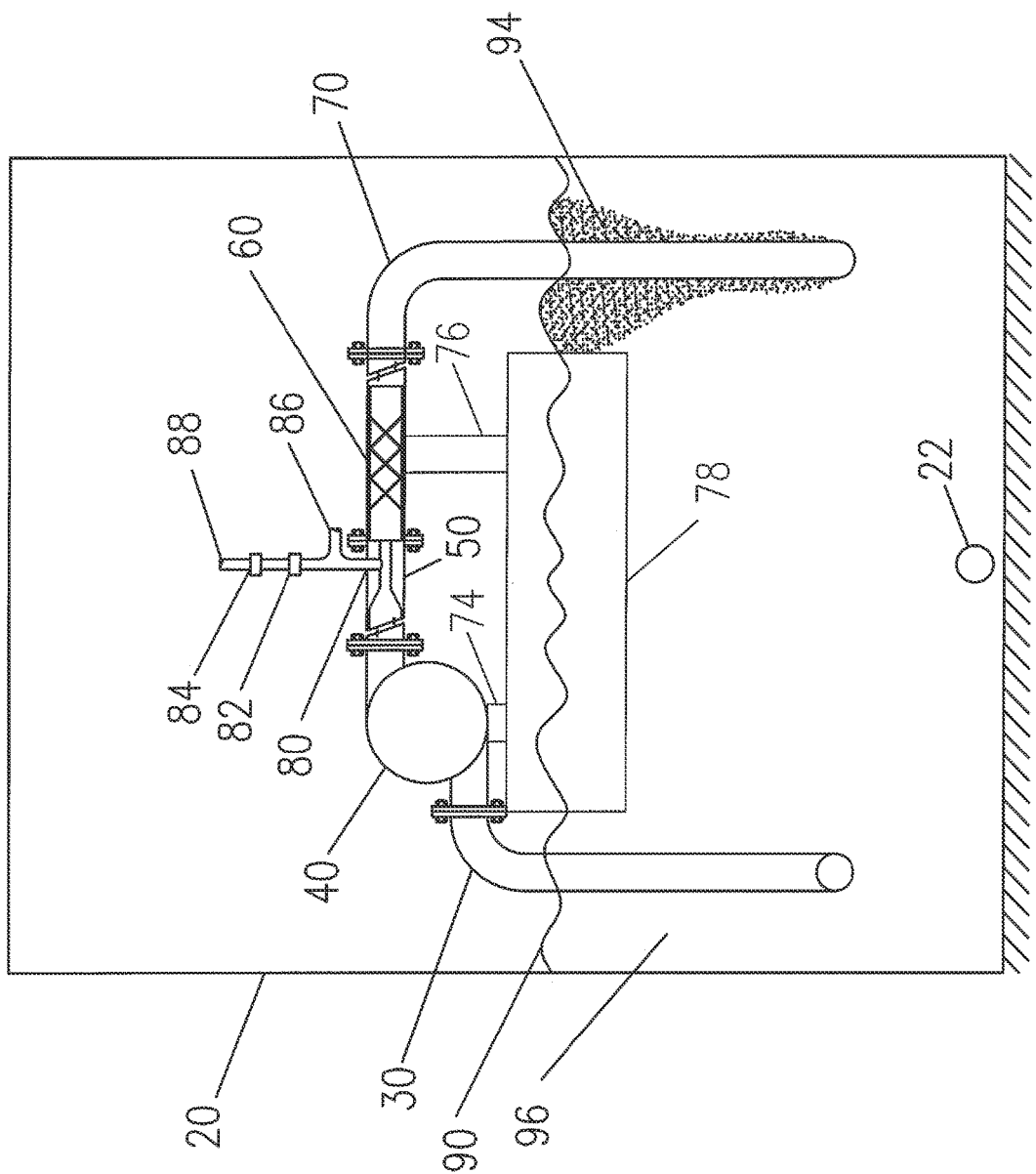
FIG. 7B is a front elevation view of the present invention with the pump, venturi aspirator and static mixer inside the storage tank, atop a suitable device floating on the water.

Referring to FIGS. 7A, 7B and 7C, the system of FIGS. 2A, 2B and 2C is installed inside the storage tank 20 mounted atop a suitable platform 78 floating on the surface 90 of the water 96 using supports 74 and 76. It is appreciated that the platform 78 acts as a flotation device and can be of any suitable design that will support the weight of the components and flexible inlet conduit 30 and outlet conduit 70. The purpose of the flotation platform 78 is to maintain a fixed relationship between the water surface 90 and depth of the inlet and outlets of the flexible conduits 30 and 70.

It should be understood that it may be desirable to use only one floating flexible conduit and one fixed conduit not connected to the flotation platform 78 as best suits the specific application.

The floating platform 78 may be wood, hollow metal, hollow plastic or other suitable material. The supports 74 and 76 may be wood, metal, plastic or other suitable material affixed using suitable and common methods, which are not shown for clarity.

Referring to FIG. 8, the THM and VOC reduction components of the system of FIGS. 2A, 2B and 2C are installed outside the storage tank 20. The inlet conduit 30 and outlet conduit 70 are connected to flexible conduits 240 and 250 respectively through the tank 20 wall. Flexible conduits 240 and 250 are attached to a suitable platform 270 floating on the water via supports 272 and 274 respectively. The floating platform 270 may be wood, hollow metal, hollow plastic or other suitable material. The supports 272 and 274 may be wood, metal, plastic or other suitable material affixed using suitable and common methods, which are not shown for clarity.

Figure 9:
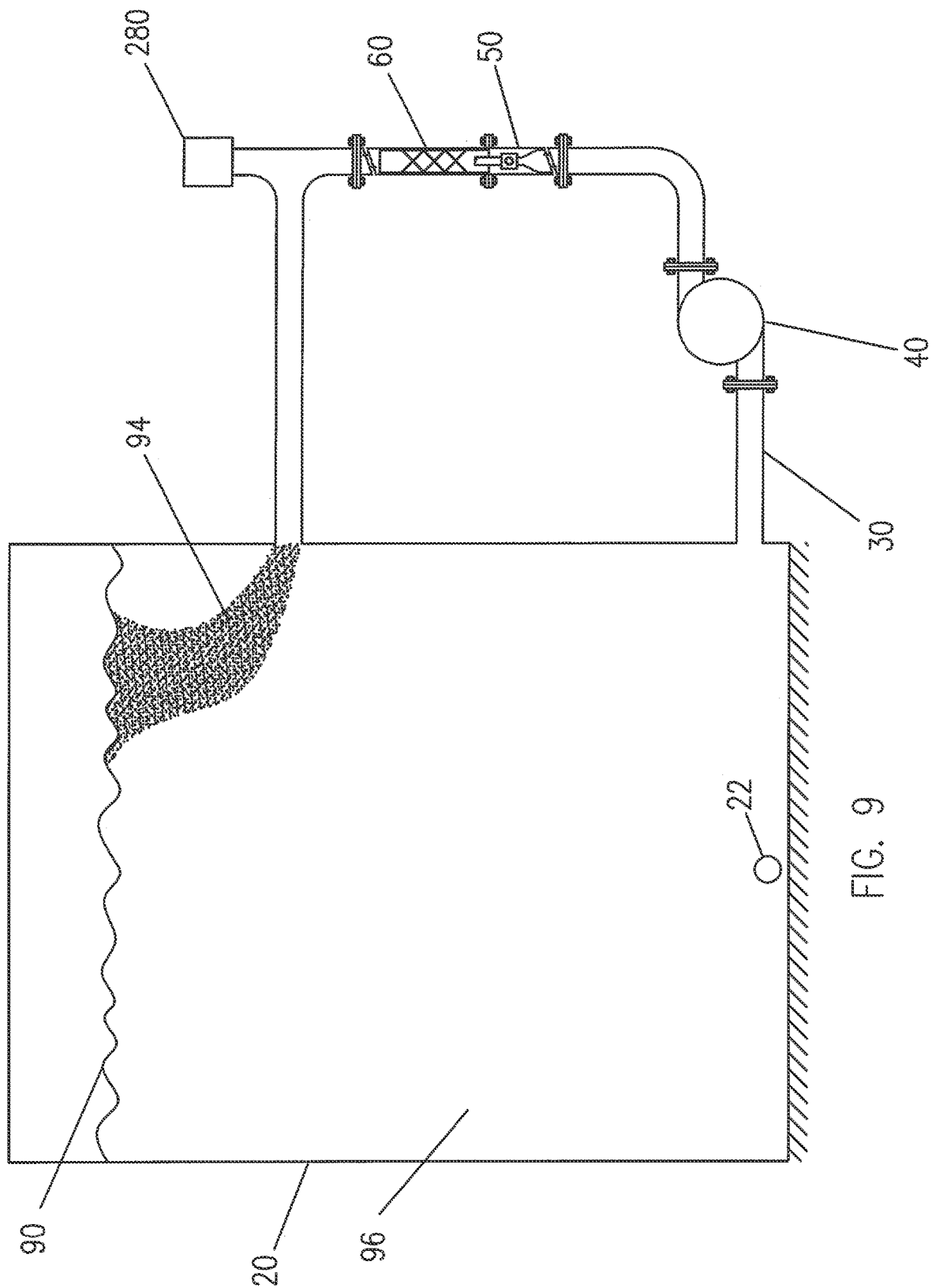
FIG. 9 is a front elevation view of the present invention that uses an automatic air release valve to reduce the amount of air introduced into the storage tank.

Referring to FIG. 9, a further non-limiting embodiment of the present invention modifies the system of FIGS. 2A, 2B and 2C by adding an automatic air release valve 280 to reduce the amount of air introduced into the storage tank 20.

Figure 10:
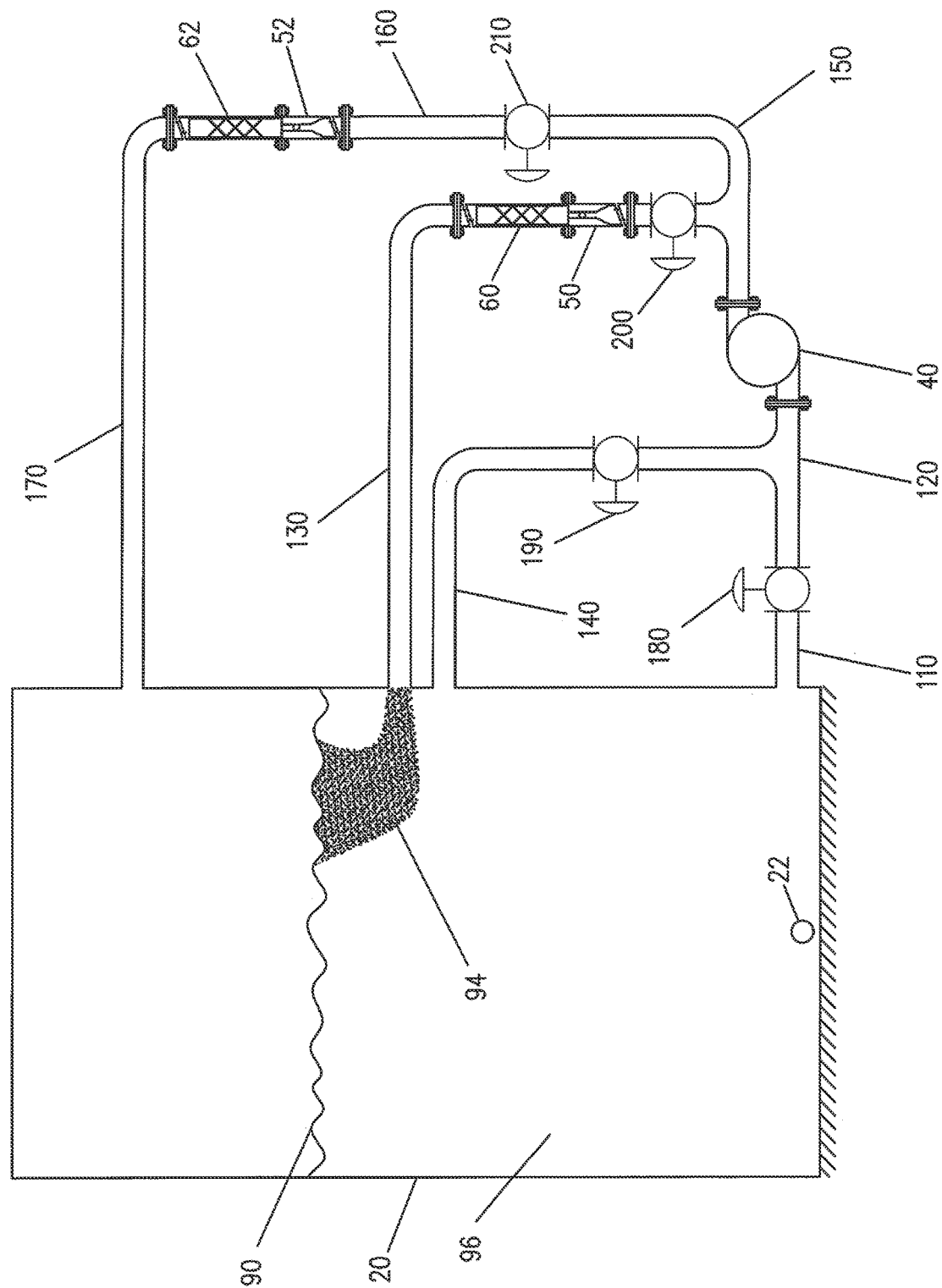
FIG. 10 is a front elevation view of the present invention that uses a single pump, two venturi aspirators, two static mixers, and four valves to select an input from either of two different locations on the storage tank and/or select an output to either of two different locations on the storage tank. In this view the water level in the tank is low.

Referring to FIG. 10, in a further non-limiting embodiment a single pump 40 operates two separate venturi aspirators 50 and 52 with their associated static diffusers 60 and 62. Flow through the system is controlled by valves 180, 190, 200, and 210. These valves are preferably power actuated, such as solenoid operated, pneumatically actuated, or the like, but may be manually operated as well, and may be either of the full open/full closed type or throttling type. In this view the water 96 level in the tank 20 is low and the lower inlet conduit 110 and lower outlet conduit 130 are active.

FIG. 10 shows valves of the full open/full closed type. Specifically valves 180 and 200 are fully open, and valves 190 and 210 are fully closed. Flow through the system begins at the inlet conduit 110 attached to the tank 20, passes through valve 180, through conduit 120, through pump 40, through conduit 150, through valve 200, through aspirator 50 where it assimilates air, through static mixer 60, and returns to the storage tank via outlet conduit 130, discharging the water 96 containing small air bubbles 94. Because valves 190 and 210 are fully closed, there is no flow through valve 210, conduit 160, venturi aspirator 52, static mixer 62, and conduit 170.

Figure 11:
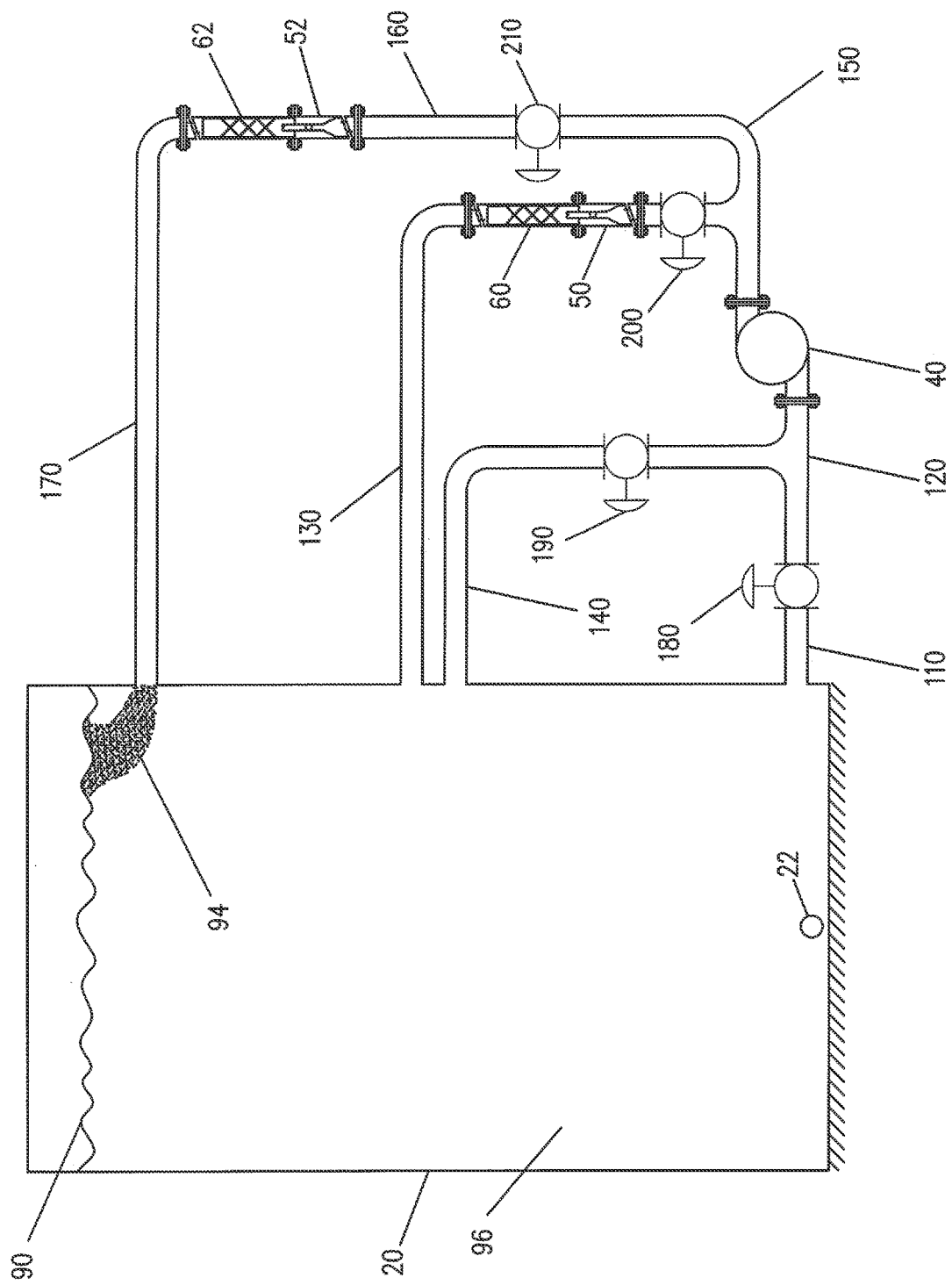
FIG. 11 is a front elevation view of the present invention that uses a single pump, two venturi aspirators, two static mixers, and four valves to select an input from either of two different locations on the storage tank and/or select an output to either of two different locations on the storage tank. In this view the water level in the tank is high.

Referring to FIG. 11, a single pump 40 operates two separate venturi aspirators 50 and 52 with their associated static mixers 60 and 62. Flow through the system is controlled by valves 180, 190, 200, and 210. These valves are preferably power actuated, such as solenoid operated, pneumatically actuated, or the like, but may be manually operated as well, and may be either of the full open/full closed type or throttling type. In this view the water 96 level in the tank 20 is high and the upper inlet conduit 140 and outlet conduit 170 are active.

FIG. 11 shows valves of the full open/full closed type. Specifically valves 180 and 200 are fully closed, and valves 190 and 210 are fully open. Flow through the system begins at the inlet of conduit 140 attached to the tank wall 20, passes through valve 190, through conduit 120, through pump 40, through conduit 150, through valve 210, through conduit 160, through venturi aspirator 52 where it assimilates air, through static mixer 62, and returns to the storage tank 20 via outlet conduit 170, discharging the water containing small air bubbles 94. Because valves 180 and 200 are fully closed, there is no flow through valve 180 through valve 200, venturi aspirator 50, static mixer 60, and conduit 130.

While this embodiment of the present invention describes flow through either inlet conduit 110 and outlet conduit 130 only, or inlet conduit 140 and outlet conduit 170 only, it should be understood that other combinations of valve positions may be used to provide different flow paths to suit the application.

Likewise, it should be understood that the valves 180, 190, 200, and 210 may be of the throttling type, allowing partial flow through any of the alternate flow paths.

Figure 12:
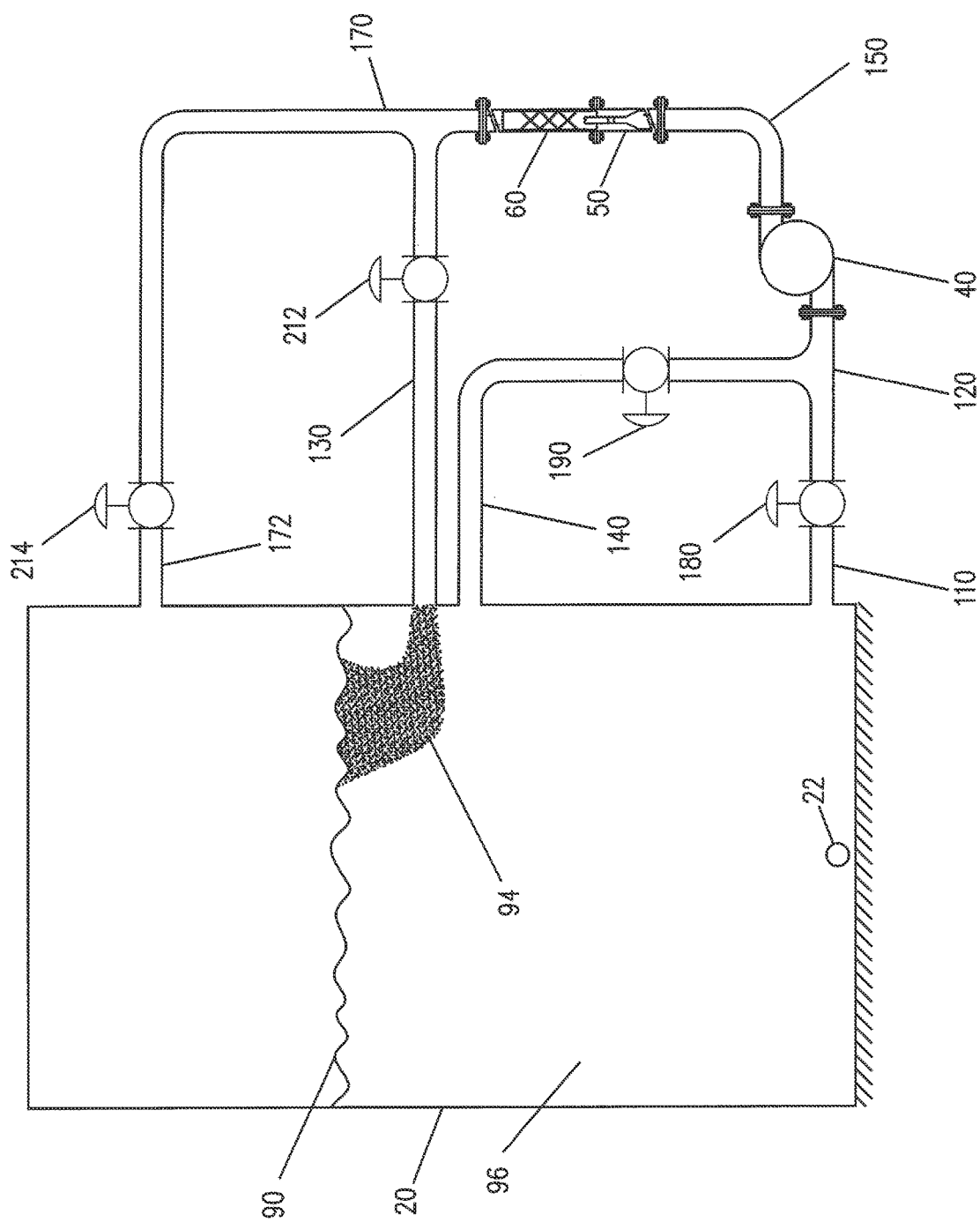
FIG. 12 is a front elevation view of the present invention that uses a single pump, single venturi aspirator, single static mixer, and four valves to select an input from either of two different locations on the storage tank and/or select an output to either of two different locations on the storage tank. In this view the water level in the tank is low.

Referring to FIG. 12, in another non-limiting embodiment a single pump 40 operates a single venturi aspirator 50 and a single static mixer 60. Flow through the system is controlled by valves 180, 190, 212, and 214. These valves are preferably power actuated, such as solenoid operated, pneumatically actuated, or the like, but may be manually operated as well, and may be either of the full open/full closed type or throttling type. In this view the water 96 level in the tank is low and the lower inlet conduit 110 and outlet conduit 130 are active.

FIG. 12 shows valves of the full open/full closed type. Specifically valves 180 and 212 are fully open, and valves 190 and 214 are fully closed. Flow through the system begins at the inlet conduit 110 attached to the tank 20, passes through valve 180, through conduit 120, through pump 40, through conduit 150, through venturi aspirator 50 where it assimilates air, through static mixer 60, through conduit 170, through valve 212, and returns to the storage tank 20 via outlet conduit 130, discharging the water containing small air bubbles 94. Because valves 190 and 214 are fully closed, there is no flow through inlet conduit 140 and outlet conduit 172.

Figure 13:
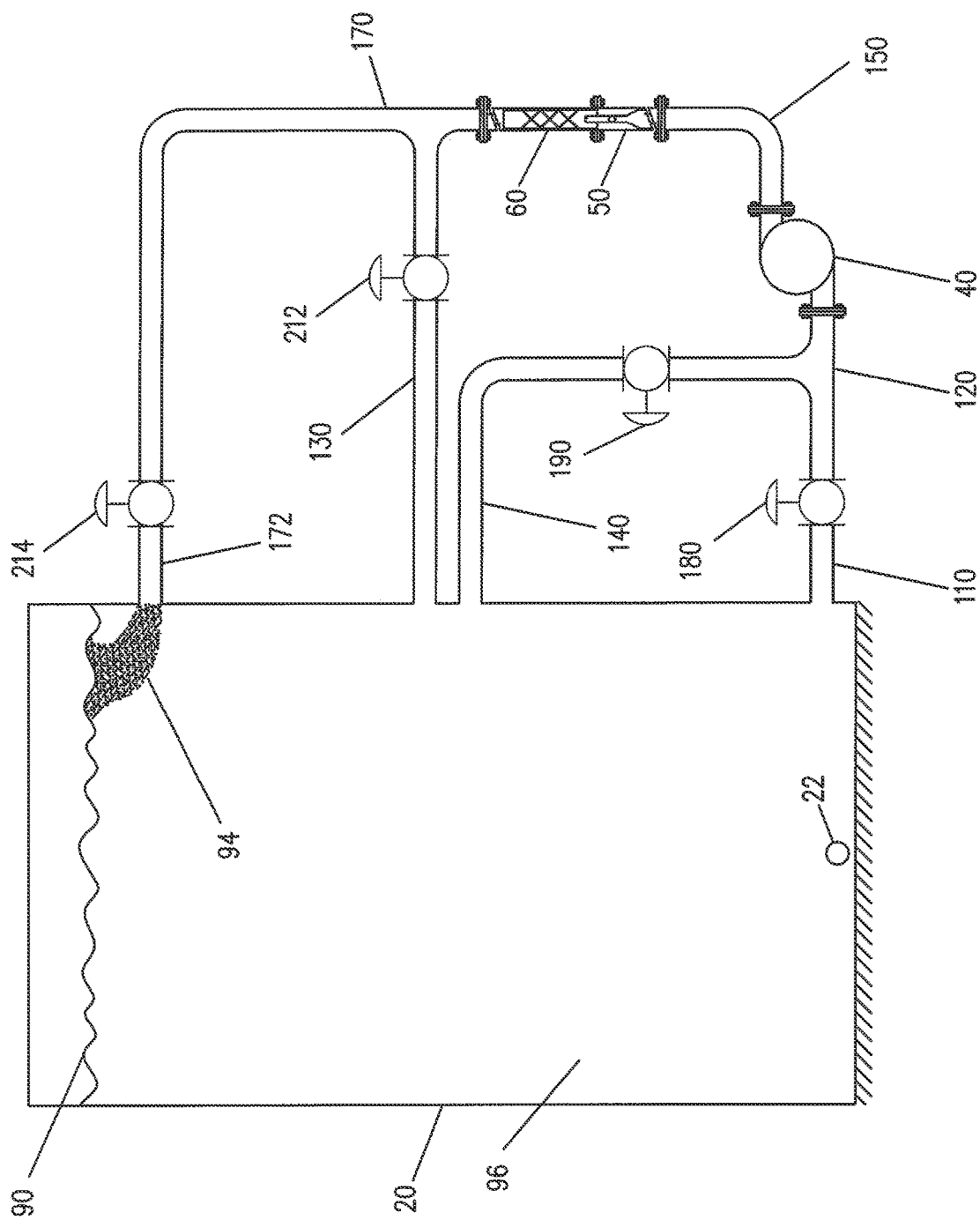
FIG. 13 is a front elevation view of the present invention that uses a single pump, single venturi aspirator, single static mixer, and four valves to select an input from either of two different locations on the storage tank and/or select an output to either of two different locations on the storage tank. In this view the water level in the tank is high.

Referring to FIG. 13, a single pump 40 operates a single venturi aspirator 50 and a single static mixer 60. Flow through the system is controlled by valves 180, 190, 212, and 214. These valves are preferably power actuated, such as solenoid operated, pneumatically actuated, or the like, but may be manually operated as well, and may be either of the full open/full closed type or throttling type. In this view the water 96 level in the tank is high and the upper inlet conduit 140 and outlet conduit 172 are active.

FIG. 13 shows valves of the full open/full closed type. Specifically valves 190 and 214 are fully open, and valves 180 and 212 are fully closed. In this view the water 96 level in the tank 20 is high and the upper inlet conduit 140 and outlet conduit 172 are active.

Flow through the system begins at the inlet conduit 140 attached to the tank 20, passes through valve 190, through conduit 120, through pump 40, through conduit 150, through venturi aspirator 50 where it assimilates air, through static mixer 60, through conduit 170, through valve 214, and returns to the storage tank via conduit 172, discharging the water 96 containing small air bubbles 94. Because valves 180 and 212 are fully closed, there is no flow through inlet conduit 110 and outlet conduit 130.

While this embodiment of the present invention describes flow through either inlet conduit 110 and outlet conduit 130 only, or inlet conduit 140 and outlet conduit 172 only, it should be understood that other combinations of valve positions may be used to provide different flow paths to suit the application.

Likewise, it should be understood that the valves 180, 190, 200, and 210 may be of the throttling type, allowing partial flow through any of the different flow paths.

Figure 14A:
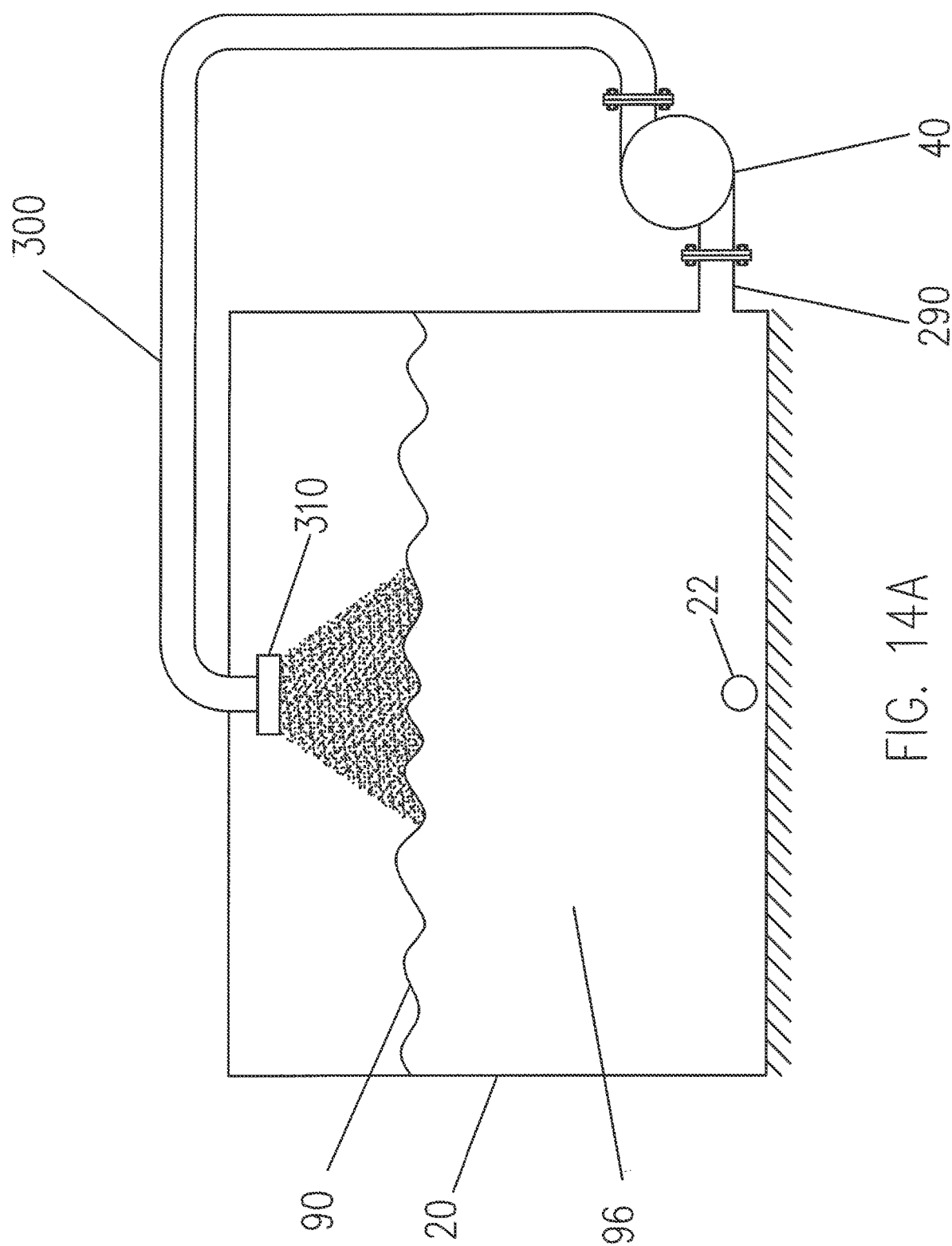
FIG. 14A is side section view of a typical spray aerator system currently in use for trihalomethane (THM) and volatile organic compound (VOC) reduction.

FIG. 14A is front section view of a typical "spray aerator" system currently in use for trihalomethane (THM) and volatile organic compound (VOC) reduction. Flow is through inlet conduit 290, through pump 40, through outlet conduit 300, and through spray nozzle 310 where the water is separated into small droplets and assimilates air, thereby reducing trihalomethane (THM) and volatile organic compound (VOC) levels somewhat before returning to the main body of water 96.

Figure 14B:
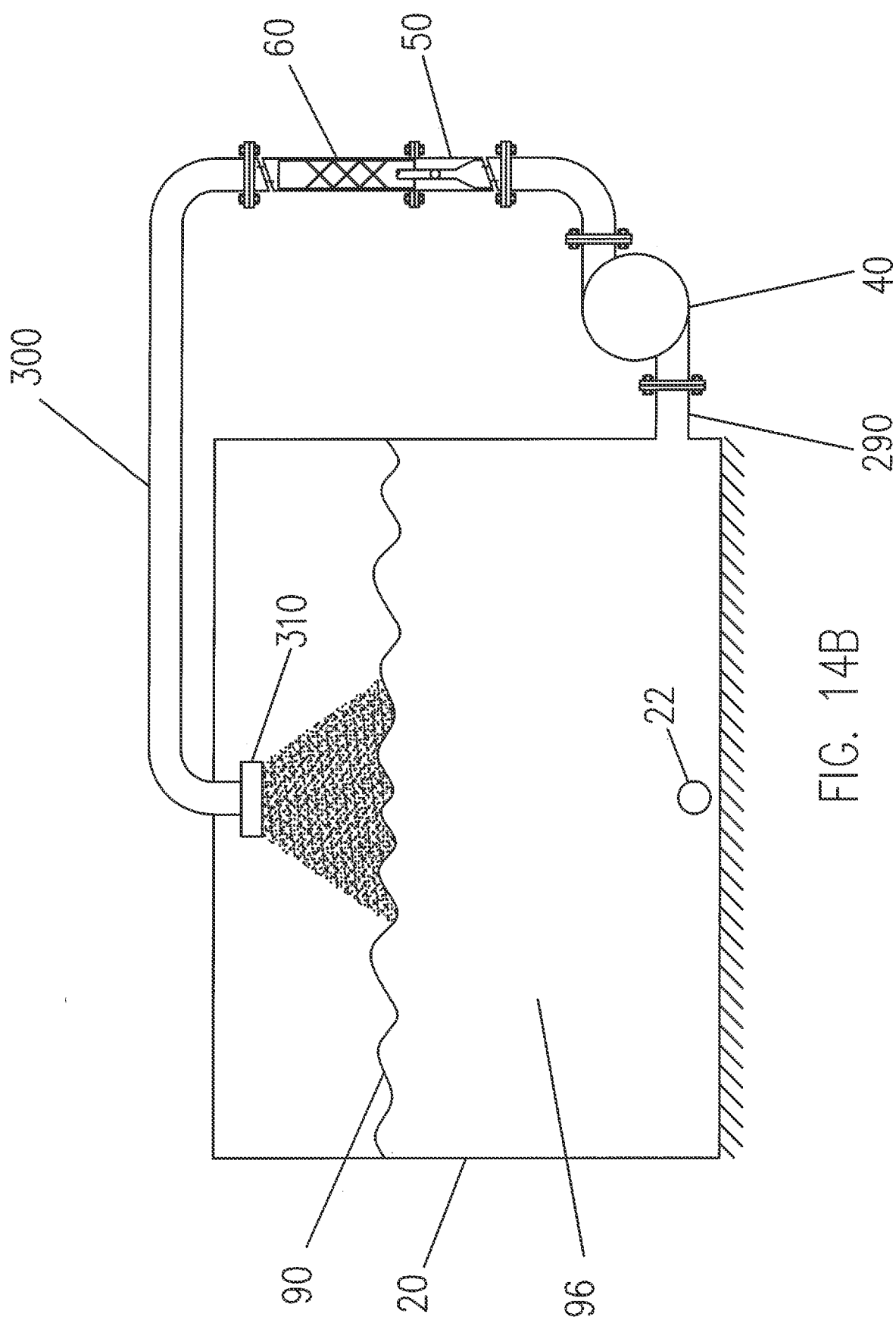
FIG. 14B is side section view of a spray aerator system for trihalomethane (THM) and volatile organic compound (VOC) reduction with the addition of the venturi aspirator and static mixer of the present invention added to augment trihalomethane (THM) and volatile organic compound reduction.

FIG. 14B shows a front section view of a further non-limiting embodiment of the present invention, with the addition of a venturi aspirator 50 and static mixer 60 added to augment trihalomethane (THM) and volatile organic compound (VOC) reduction. This modification uses the existing pump and requires virtually no additional power to operate, while substantially improving the effectiveness of the system.

Flow is through inlet conduit 290, through pump 40, through the venturi aspirator 50, through the static mixer 60, through outlet conduit 300, and through spray nozzle 310 where the water is separated into small droplets and assimilates additional air, further reducing trihalomethane (THM) and volatile organic compound (VOC) levels before returning to the main body of water 96.

Whereas particular embodiments of this invention have been described above for purposes of illustration, it will be evident to those skilled in the art that numerous variations of the details of the present invention may be made without departing from the invention.

The invention claimed is:

1. A trihalomethane (THM) and volatile organic compound (VOC) removal system comprising:

a storage vessel;
a fluid inlet on said storage vessel wherein fluid enters said storage vessel;
a fluid outlet on said storage vessel wherein fluid exits said storage vessel; and
a fluid fitting on said storage vessel,
wherein a fluid leaves said storage vessel via an inlet conduit attached to the fluid fitting and flows through a pump and passes through a venturi aspirator and flows through a static mixer, and returns to said storage vessel through an outlet conduit attached to said storage vessel, and
wherein the fluid leaves the storage vessel through the inlet conduit attached to the fluid fitting without penetrating the storage vessel walls.

2. The system of claim 1, wherein the venturi aspirator comprises a check valve, a filter and/or a means for connecting a source of fluid to an air inlet port of the said venturi aspirator.

3. The system of claim 1, wherein an inlet conduit extension is connected to the inlet conduit and extends into the storage tank.

4. The system of claim 1, wherein an outlet conduit extension is connected to the outlet conduit and extends into the storage tank.

5. The system of claim 1, wherein a perforated outlet conduit extension is connected to the outlet conduit and extends into the storage tank.

6. The system of claim 5, where a length of the perforated outlet conduit extension comprises a plurality of openings for the fluid to return and disperse in various locations of the storage vessel.

7. The system of claim 1, wherein the fluid returns to the storage vessel through the outlet conduit extending into the storage vessel without penetrating the storage vessel walls.

8. The system of claim 1, wherein the pump, the venturi aspirator, and the static mixer are mounted on a platform attached to the storage vessel.

9. The system of claim 8, wherein the platform comprises at least one support to mount the pump, the venturi aspirator, and the static mixer.

10. The system of claim 1, further comprising an automatic air release valve to reduce an amount of air introduced into the storage vessel.

11. The system of claim 1, wherein the outlet conduit comprises a spray nozzle that extends over a sidewall of the tank to return the fluid to the storage vessel.

12. A trihalomethane and volatile organic compound removal system comprising:
a storage vessel;
a fluid inlet on said storage vessel wherein fluid enters said storage vessel;
a fluid outlet on said storage vessel wherein fluid exits said storage vessel;
a pump;
a first valve connected between said pump and said storage vessel via a first inlet conduit;
a second valve connected between said pump and said storage vessel via a second inlet conduit;
a first arrangement comprising a valve, venturi aspirator, and a static mixer, wherein one end of said first arrangement is connected to the storage vessel via a first outlet conduit and a second end of said first arrangement is connected to said pump; and
a second arrangement comprising a valve, venturi aspirator, and a static mixer, wherein one end of said second arrangement is connected to the storage vessel via a second outlet conduit and a second end of said second arrangement is connected to said pump.

13. The system of claim 12, wherein the venturi aspirator comprises a check valve, a filter and/or a means for connecting a source of fluid to an air inlet port of the venturi aspirator.

14. A trihalomethane and volatile organic compound removal system comprising:
a storage vessel;
a fluid inlet on said storage vessel wherein fluid enters said storage vessel;
a fluid outlet on said storage vessel wherein fluid exits said storage vessel;
a pump;
a first valve connected between said pump and said storage vessel via a first inlet conduit;
a second valve connected between said pump and said storage vessel via a second inlet conduit; and
an arrangement comprising a venturi aspirator and a static mixer, wherein one end of said arrangement is connected to said pump;
wherein a second end of said arrangement is connected to a first side of a third valve and a first side of a fourth valve;
wherein a second side of the third valve is connected to the storage vessel via a first outlet conduit, and
wherein a second side of the fourth valve is connected to the storage vessel via a second outlet conduit.

15. The system of claim 14, wherein the venturi aspirator comprises a check valve, a filter and/or a means for connecting a source of fluid to an air inlet port of the venturi aspirator.

16. A trihalomethane (THM) and volatile organic compound (VOC) removal system comprising:
a storage vessel;
a fluid inlet on said storage vessel wherein fluid enters said storage vessel;
a fluid outlet on said storage vessel wherein fluid exits said storage vessel; and
a fluid fitting on said storage vessel,
wherein a fluid leaves said storage vessel via an inlet conduit attached to the fluid fitting and flows through a pump and passes through a venturi aspirator and flows through a static mixer, and returns to said storage vessel through an outlet conduit attached to said storage vessel,
wherein the fluid leaves the storage vessel through the inlet conduit attached to the fluid fitting without penetrating the storage vessel walls,
wherein the pump, the venturi aspirator, and the static mixer are mounted on a platform that floats on a surface of the fluid in the storage vessel.

17. The system of claim 16, wherein a first length of the inlet conduit extends inside the storage vessel and is flexible, and a second length of the outlet conduit extends into the storage vessel and is flexible, wherein the first length of inlet conduit and the second length of outlet conduit are attached to the platform that floats.

* * * * *